US008392155B2

(12) United States Patent
Seko et al.

(10) Patent No.: US 8,392,155 B2
(45) Date of Patent: Mar. 5, 2013

(54) PARTICLE BEHAVIOR ANALYSIS SYSTEM, INFORMATION PROCESSING SYSTEM, AND COMPUTER READABLE MEDIUM

(75) Inventors: Tomohiro Seko, Kanagawa (JP); Yoichi Watanabe, Kanagawa (JP); Hideki Okamoto, Kanagawa (JP); Nobuyuki Hirooka, Kanagawa (JP); Ryosuke Takahashi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 642 days.

(21) Appl. No.: 12/549,995

(22) Filed: Aug. 28, 2009

(65) Prior Publication Data

US 2010/0191477 A1 Jul. 29, 2010

(30) Foreign Application Priority Data

Jan. 28, 2009 (JP) ................................ 2009-016219

(51) Int. Cl.

| | |
|---|---|
| ***G06F 7/60*** | (2006.01) |
| ***G06F 17/10*** | (2006.01) |
| ***G06G 7/48*** | (2006.01) |
| ***G06G 7/50*** | (2006.01) |
| ***G06G 7/58*** | (2006.01) |

(52) U.S. Cl. .......... 703/2; 703/6; 703/9; 703/11; 703/12

(58) Field of Classification Search .................. 703/1, 2, 703/6, 9, 11, 12

See application file for complete search history.

(56) References Cited

U.S. PATENT DOCUMENTS

| | | | | |
|---|---|---|---|---|
| 5,594,671 | A * | 1/1997 | Chen et al. | 703/6 |
| 7,526,415 | B2 * | 4/2009 | Shan et al. | 703/2 |
| 7,707,016 | B2 * | 4/2010 | Shaw | 703/6 |
| 7,860,695 | B2 * | 12/2010 | Fitch et al. | 703/6 |
| 8,024,162 | B2 * | 9/2011 | Seko et al. | 703/6 |
| 8,065,090 | B2 * | 11/2011 | Fitch et al. | 702/19 |
| 8,082,108 | B2 * | 12/2011 | Fitch et al. | 702/19 |
| 8,223,155 | B2 * | 7/2012 | Cohen et al. | 345/474 |
| 8,279,227 | B2 * | 10/2012 | Cohen | 345/473 |
| 2002/0161562 | A1 * | 10/2002 | Strunk et al. | 703/6 |
| 2003/0227455 | A1 * | 12/2003 | Lake et al. | 345/421 |
| 2005/0165874 | A1 * | 7/2005 | Zhang et al. | 708/446 |
| 2006/0149516 | A1 * | 7/2006 | Bond et al. | 703/6 |
| 2006/0217945 | A1 * | 9/2006 | Leprevost | 703/2 |

(Continued)

FOREIGN PATENT DOCUMENTS

| | | |
|---|---|---|
| JP | A-2007-193152 | 8/2007 |
| JP | A-2007-265143 | 10/2007 |

OTHER PUBLICATIONS

Hess et al. "GROMACS 4: Algorithms for Highly Efficient, Load-Balanced, and Scalable Molecular Simulation", J. Chem. Theory Comput. 2008, 4, 435-447.*

(Continued)

*Primary Examiner* — Shambhavi Patel
(74) *Attorney, Agent, or Firm* — Oliff & Berridge, PLC

(57) ABSTRACT

A particle behavior analysis system includes a calculation section that, regarding a decomposition portion decomposed in accordance with a decomposition method in a range to be analyzed, considers interaction force with another substance that acts on a particle and calculates behavior of the particle, while performing information communication with other devices; and an output processing section that switches output advisability of an analysis result obtained by the calculation section based on priority of the decomposition portion corresponding to the advisability of output processing of the analysis result.

17 Claims, 26 Drawing Sheets

U.S. PATENT DOCUMENTS

| | | | | |
|---|---|---|---|---|
| 2006/0235659 | A1* | 10/2006 | Stam | 703/2 |
| 2006/0241928 | A1* | 10/2006 | Fitch et al. | 703/22 |
| 2007/0233440 | A1* | 10/2007 | Fitch et al. | 703/6 |
| 2008/0192047 | A1* | 8/2008 | Radzikowski et al. | 345/419 |
| 2008/0243452 | A1* | 10/2008 | Bowers et al. | 703/2 |

OTHER PUBLICATIONS

Linde, Mattias. "Parallel Simulation of Particle Fluids", Dec. 2007.*

Li et al. "A Cyclic Force Decomposition Algorithm for Parallelising Three-Body Interactions in Molecular Dynamics Simulations", Proceedings of the First International Multi-Symposiums on Computer and Computational Sciences (IMSCCS'06).*

Kale et al. "Parallel Molecular Dynamics Visualization using MPI with MPE Graphics", 1996 IEEE.* van der Spoel et al. "GROMACS User Manual", 2004.*

Martino et al. "An high performance Fortran implementation of a Tight-Binding Molecular Dynamics simulation", Computer Physics Communications 120 (1999) 255-268.*

Sun et al. "Distributed Particle Simulation Method on Adaptive Collaborative System", 2001.*

Sumanth et al. "Novel Force Matrix Transformations with Optimal Load-Balance for 3-body Potential based Parallel Molecular Dynamics in a Heterogeneous Cluster Environment", CSE Technical Report 2007.*

Sutmann et al. "A Load Balanced Force-Domain Decomposition Algorithm for Parallel Molecular Dynamics", Computational Biophysics to Systems Biology (CBSB07), Proceedings of the NIC Workshop 2007.*

Fleissner et al. "Load Balanced Parallel Simulation of Particle-Fluid DEM-SPH Systems with Moving Boundaries", Parallel Computing: Architectures, Algorithms and Applications, NIC Series, vol. 38, ISBN 978-3-9810843-4-4, pp. 37-44, 2007.*

Fleissner et al. "Dynamical Particle Simulation with Parallel Cache-Aware Domain Decomposition Strategies", PAMM • Proc. Appl. Math. Mech. 5, 657-658 (2005).*

* cited by examiner

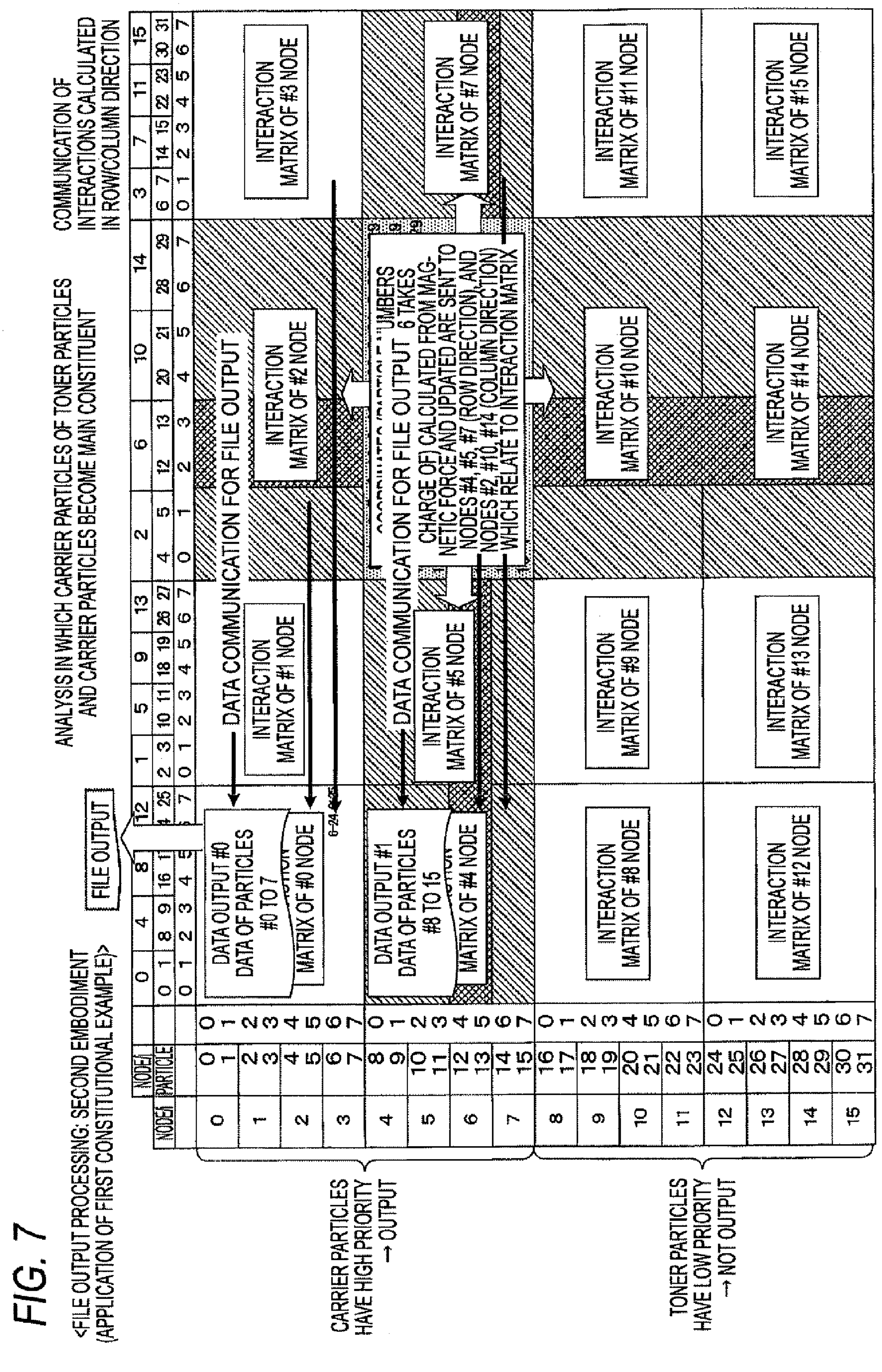
FIG. 7
<FILE OUTPUT PROCESSING: SECOND EMBODIMENT
(APPLICATION OF FIRST CONSTITUTIONAL EXAMPLE)>
FILE OUTPUT
ANALYSIS IN WHICH CARRIER PARTICLES OF TONER PARTICLES
AND CARRIER PARTICLES BECOME MAIN CONSTITUENT
COMMUNICATION OF
INTERACTIONS CALCULATED
IN ROW/COLUMN DIRECTION
NODE/PARTICLE
DATA OUTPUT #0
DATA OF PARTICLES
#0 TO 7
MATRIX OF #0 NODE
DATA OUTPUT #1
DATA OF PARTICLES
#8 TO 15
MATRIX OF #4 NODE
DATA COMMUNICATION FOR FILE OUTPUT
INTERACTION MATRIX OF #1 NODE
INTERACTION MATRIX OF #2 NODE
INTERACTION MATRIX OF #3 NODE
INTERACTION MATRIX OF #5 NODE
INTERACTION MATRIX OF #7 NODE
INTERACTION MATRIX OF #8 NODE
INTERACTION MATRIX OF #9 NODE
INTERACTION MATRIX OF #10 NODE
INTERACTION MATRIX OF #11 NODE
INTERACTION MATRIX OF #12 NODE
INTERACTION MATRIX OF #13 NODE
INTERACTION MATRIX OF #14 NODE
INTERACTION MATRIX OF #15 NODE
DATA COMMUNICATION FOR FILE OUTPUT 6 TAKES
CHARGE OF) CALCULATED FROM MAG-
NETIC FORCE AND UPDATED ARE SENT TO
NODES #4, #5, #7 (ROW DIRECTION), AND
NODES #2, #10, #14 (COLUMN DIRECTION)
WHICH RELATE TO INTERACTION MATRIX
CARRIER PARTICLES
HAVE HIGH PRIORITY
→ OUTPUT
TONER PARTICLES
HAVE LOW PRIORITY
→ NOT OUTPUT <FILE OUTPUT PROCESSING: FOURTH EMBODIMENT>
* ASSIGNMENT BETWEEN ATOM TYPE AND PRIORITY

PRIORITY: (CARBON ATOM C) > (OXYGEN ATOM O) > (HYDROGEN ATOM H)

<FILE OUTPUT PROCESSING: FIFTH EMBODIMENT (FIRST EXAMPLE)>
*ASSIGNMENT BETWEEN DISTRIBUTION AND PRIORITY

<FILE OUTPUT PROCESSING: FIFTH EMBODIMENT (SECOND EXAMPLE)>
*ASSIGNMENT BETWEEN DISTRIBUTION AND PRIORITY

<FILE OUTPUT PROCESSING: FIFTH EMBODIMENT (THIRD EXAMPLE)>
*ASSIGNMENT BETWEEN DISTRIBUTION AND PRIORITY

PARTICLE BEHAVIOR ANALYSIS SYSTEM, INFORMATION PROCESSING SYSTEM, AND COMPUTER READABLE MEDIUM

CROSS-REFERENCE TO RELATED APPLICATION

This application is based on and claims priority under 35 USC 119 from Japanese Patent Application No. 2009-016219 filed on Jan. 28, 2009.

BACKGROUND

1. Technical Field

The present invention relates to a particle behavior analysis system, an information processing system, and a computer readable medium storing a program.

2. Related Art

Information processing systems which perform digital processing, a system which performs parallel processing by means of plural processors (calculation devices) has been known. Such the information processing system is referred to also as a multiprocessor system.

SUMMARY

According to an aspect of the invention, a particle behavior analysis system includes a calculation section that, regarding a decomposition portion decomposed in accordance with a decomposition method in a range to be analyzed, considers interaction force with another substance that acts on a particle and calculates behavior of the particle, while performing information communication with other devices; and an output processing section that switches output advisability of an analysis result obtained by the calculation section based on priority of the decomposition portion corresponding to the advisability of output processing of the analysis result.

BRIEF DESCRIPTION OF THE DRAWINGS

Exemplary embodiments of the invention will be described in detail based on the following figures, wherein:

FIG. 7 is a diagram for explaining a second exemplary embodiment of file output processing;

DETAILED DESCRIPTION

Exemplary embodiments of the invention will be described below with reference to drawings in detail. As a concrete example to which an information processing system is applied, a particle behavior analysis system will be described below. As an example of the particle behavior analysis system in which particles to be analyzed exist, an image forming apparatus such as a printer device, a facsimile device, or a multifunctional machine having functions of the printer and the facsimile will be described.

Regarding relation with the particles to be analyzed, attention is focused on developer behavior analysis in a development device of an electrophotographic type image forming apparatus which uses developer composed of only toner particles or composed of carrier particles and toner particles. However, this is simply an example, and the apparatus in which the particles to be analyzed exist is not limited to the image forming apparatus.

<Outline of Image Forming Apparatus>

Figure 1:
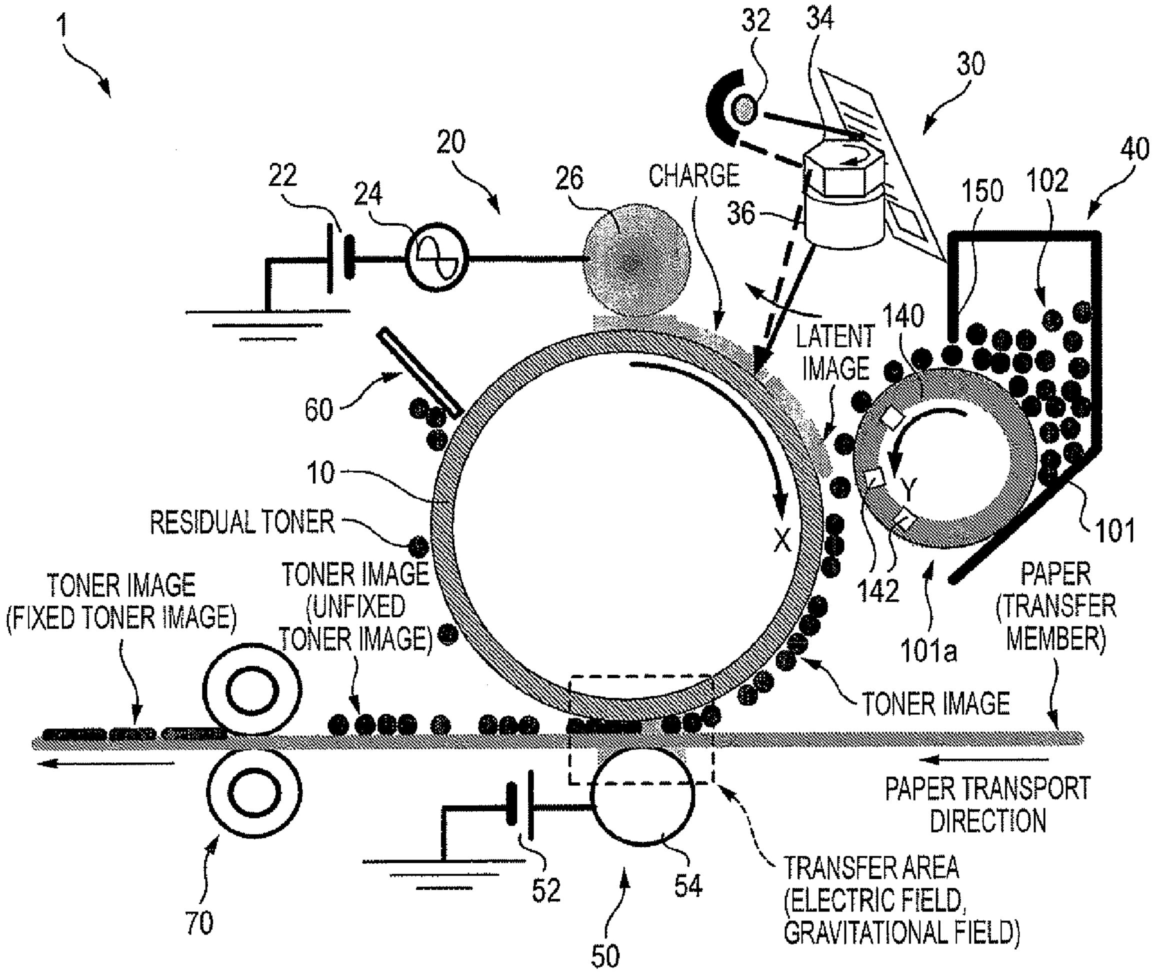
FIG. 1 is a diagram showing a constitutional example of an electrophotographic type image forming apparatus.

FIG. 1 is a diagram showing a constitutional example of an electrophotographic type image forming apparatus such as a printing device (printer) or a copying apparatus (copying machine). As shown in the figure, an image forming apparatus 1 includes, around a photoconductor 10, a charging device 20 which is arranged near the photoconductor 10 and includes a DC power source 22, an AC bias power source 24, and a charger 26; an exposure device 30 which includes a laser light source 32, a polygon mirror 34, and a motor 36; a development device 40 including a not-shown agitation mechanism; a transfer device 50 which includes a transfer power source 52 and a transfer section 54; a cleaning device 60 having a blade mechanism; and a transfer device 70 which includes a roll mechanism arranged in a predetermined position on the downstream side on the paper transport path.

Into the development device 40, developer particles 120 are filled. In the figure, one developer particle 120 is shown by one circle for descriptive purposes. Actually, the developer particle 102 is, for example, a two-component developer type mainly composed of carrier particles that are made of magnetic substances, and non-magnetic toner particles (for example, toner particles of each color). By pairs of the carrier particles and the toner particles, magnetic powder is formed as a whole. The toner particles are attracted to the carrier particle by the electrostatic force. Generally, the particle diameter of the carrier particle is larger than that of the toner particle. Magnetic toner may be also used as the toner particle. The developer particle 102 actually includes also another particle than the carrier particle and the toner particle, such as a particle of additive.

The development device 40 includes, in a storage container 101, a development roll 140 (also called a mag roll, a magnet roller, or a magnetic convey member) as an example of a carry roll for carrying the developer particle 102 on a surface so that a peripheral surface of the development roll 140 is projected a little from an opening portion 101*a*. In the development roll 140, a predetermined number of magnets 142 are placed at predetermined intervals along the inner peripheral edges of the development roll 140.

Further, the development device 40 includes, in the vicinity of the development roll 140, a regulation blade 150 functioning as a height regulation member and a layer formation member, which regulates the height (pile height) of magnetic brush of the developer particles 102 produced along the magnetic lines of force of the magnets 142.

The development roll 140 is rotated together with the photoconductor 10 rotated in the direction of an arrow X, and the rotational direction of the surface of the development roll 140 on the opposite side to the photoconductor 10 is the same direction (direction of an arrow Y) as the moving direction X of the photoconductor 10. Further, the rotation of the development roll 140 may be driven in the opposite direction to the moving direction X of the photoconductor 10.

The developer particles 102 are conveyed to the development roll 140 while being agitated by an agitation and convey member (not shown) having an agitating function and frictionally charged. The attraction amount of the developer particles 102 to the development roll 140 is regulated by the regulation blade 150, and the developer particles 102 are attached on the peripheral edge of the development roll 140 at a fixed height. The carrier particles form a magnetic brush by a magnetic field from the magnets 142 contained in the development roll 140. The toner particles are conveyed to the portion opposed to the photoconductor 10 together with the carrier particles.

In case that the image forming apparatus 1 is constituted as a copying machine, by the charging device 20, the AC bias voltage from the AC bias power source 24 is superposed on the DC voltage from the DC power source 22, thereby to produce a charge potential (initial potential); and the surface of the photoconductor 10 is charged at this charge potential.

Thereafter, in accordance with image data obtained by scanning an original document by a not-shown reading device, the surface of the photoconductor 10 is scanned through the polygon mirror 34 rotation-driven by the motor 36 with the laser beams irradiated from the laser light source 32 provided for the exposure device 30, whereby the photoconductor 10 surface is exposed and an electrostatic latent image made of latent image potential is formed on the photoconductor 10 surface.

Next, the development device 40, while mixing the developer particles 102 composed of the toner particles of output color and the carrier particles by the not-shown agitation mechanism, superposes the toner particle in its developer particles 102 on the electrostatic latent image formed on the photoconductor 10 surface, whereby a toner image is formed on the photoconductor 10 surface.

Namely, the development roll 140 is provided opposed to the photoconductor 10, and the toner particles of the developer particles 102 attracted to the development roll 140 are charged and attracted to the photoconductor 10 by the electrostatic force. At this time, the surface of the photoconductor 10 is charged in response to a record image, whereby an electrostatic latent image is formed on the surface of the photoconductor 10; and the toner particles are attracted correspondingly to the electrostatic latent image formed on the photoconductor 10. Hereby, the latent image formed on the photoconductor 10 is made visible. The carrier particles after the development processing and the toner particles which have not been moved to the photoconductor 10 surface are collected in the storage container 101.

Thereafter, the transfer device 50 transfers the toner image formed on the photoconductor 10 surface onto printing paper conveyed from the outside. A predetermined range where the photoconductor 10 and the transfer section 54 are opposed to each other is referred to as a transfer area.

The paper after the transfer is conveyed to the fixing device 70, and the toner image is fixed onto the printing paper as a transfer body by fusing and pressing by the fixing device 70. The paper after the transfer is discharged to the outside of the image forming apparatus 1 by a not-shown discharge device.

On the other hand, the cleaning device 60 removes the residual toner remaining on the surface of the photoconductor 10 after the transfer by the transfer device 50. Though the residual potential remains on the surface of the photoconductor 10 after cleaning, it is utilized in the next electrophotographic process after the initial potential has been applied to the photoconductor 10 by the charging device 20.

A color image forming apparatus 1 is may be constituted as a tandem type color image forming apparatus having the following constitution as the constitution of a main part relating to image formation: toner images on the photoconductor

10 are not transferred by the transfer device 50 directly onto paper that is the transfer body, but transferred onto an intermediate transfer belt one color by one color (in particular, referred to as a primary transfer); and thereafter, the toner images on the intermediate transfer belt are transferred onto the paper (in particular, referred to as a secondary transfer). In this case, plural engines corresponding to output colors of K (black), Y (yellow), M (magenta), and C (cyan) are arranged in an in-line manner in order of, for example, K, Y, M and C, and the images of K, Y, M and C are processed in parallel (simultaneously) by the four engines. Namely, at time intervals corresponding to the arrangement position of the engines, the toner images on the photoconductor 10 are transferred onto the intermediate transfer belt one color by one color.

Such the electrophotographic process includes plural steps of: charging of the photoconductor 10; exposure of the scanned original image; development, that is, toner superposition onto the photoconductor 10; toner transfer and toner fixing onto paper; and cleaning of the photoconductor 10. By applying a particle behavior analysis simulation to each step in the electrophotographic process such as the agitation, the development or the transfer, an image to be formed is predicted and evaluated without performing actually an image formation test. Thus, analysis of the behavior of the carrier particles and the toner particles becomes an important element for developments of the electrophotographic apparatus main body and the development device 40.

For example, in analysis of the development device 40, the agitation step and the development step become objects to be analyzed. A predetermined range area on the agitation and convey member side of regulation blade 150 is referred to as a layer forming area, and actions of a magnetic field and a gravitational field are considered in the particle behavior analysis of the developer particle 102. A predetermined range area where the developer particles are agitated and conveyed by the agitation and convey member is referred to as an agitation and convey area, and action of a gravitational field is considered in the particle behavior analysis of the developer particle 102.

A predetermined range area where the developer particles 102 between the agitation and transport area and the layer forming area are attracted to the development roll 140 is referred to as a pick-up area, and actions of a magnetic field and a gravitational field are considered in the particle behavior analysis of the developer particle 102.

An range area where the respective peripheral edges of the photoconductor 10 and the development roll 140 are opposed to each other and the development action is performed is referred to as a development nip area, and actions of an electric field, a magnetic field and a gravitational field are considered in the particle behavior analysis of the developer particle 102. A predetermined range area where the developer particles 102 are collected is referred to as a pick-off area, and actions of a magnetic field and a gravitational field are considered in the particle behavior analysis of the developer particle 102.

The surface of the photoconductor 10 is charged in response to the record image, and the toner particles are moved to the surface of the photoconductor 10 by the electrostatic force. The moved toner particles adhere to the surface of the photoconductor 10, and a toner image corresponding to the record image is formed. At this time, the image quality of the record image depends on how the toner particles are attracted to the photoconductor 10. Since the toner particles are moved to the photoconductor 10 by the carrier particles, how the toner particles are attracted to the photoconductor 10 is determined by the behavior of the carrier particles and the toner particles in the development nip area between the development roll 140 and the photoconductor 10.

Further, in the transfer step by the transfer device 50, while changing condition parameters in the transfer step such as photoconductor surface roughness, difference in speed between the transfer bodies such as the photoconductor/the intermediate transfer belt and the paper, and contact width between the transfer bodies, the particle behavior analysis simulation is repeated, whereby the quality of image to be formed is evaluated while the transfer step is being reproduced. Incidentally, in the particle behavior analysis in the transfer step, an electric field and a gravitational field which act on the developer particles 102 (particularly on the toner particles) are considered.

<Particle Behavior Analysis System>

Figure 2:
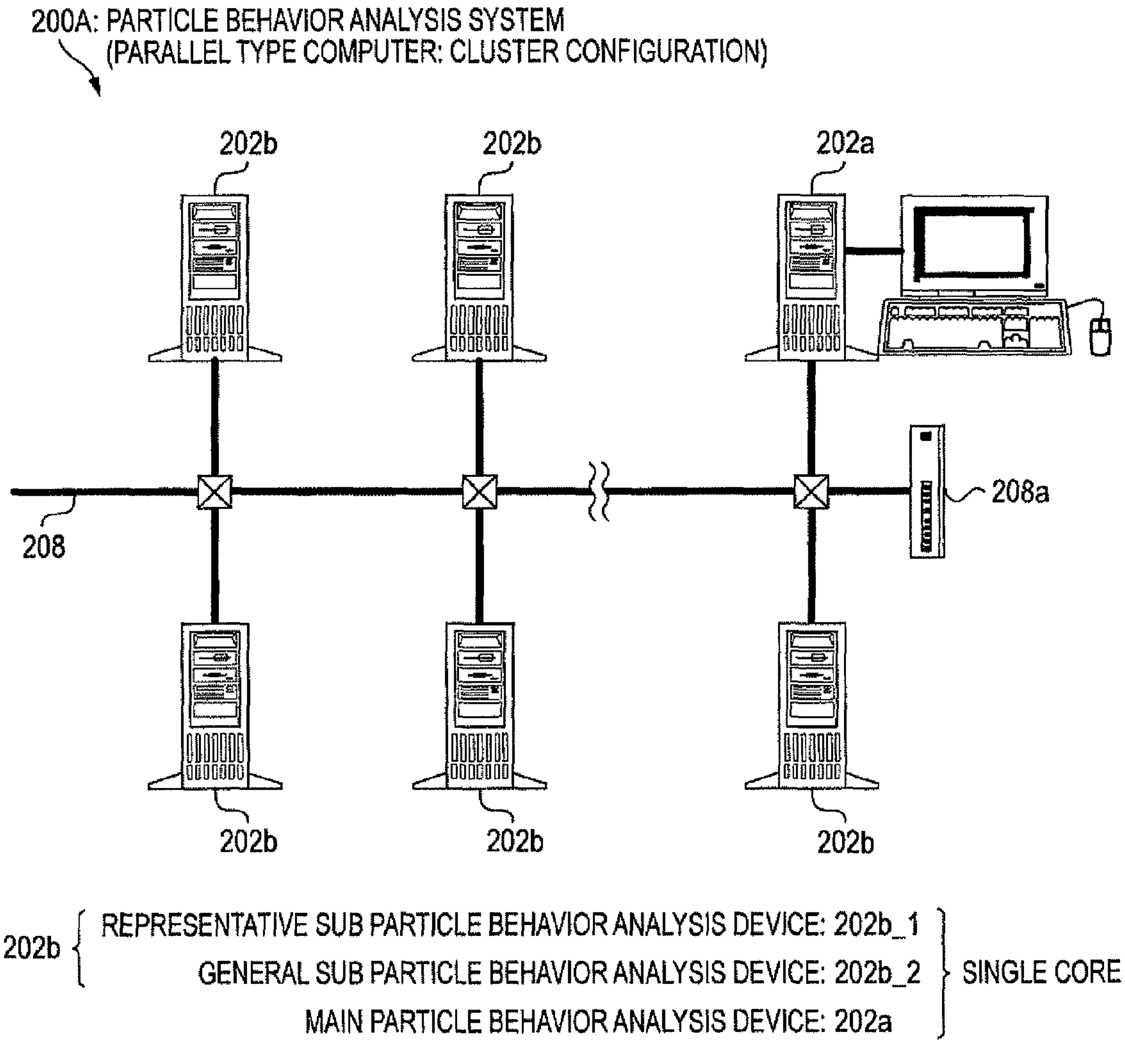
FIG. 2 is a block diagram showing a constitutional example of a particle behavior analysis system.

FIG. 2 is a block diagram showing a constitutional example of a particle behavior analysis system. In the particle behavior analysis system, when each interaction is analyzed, a tendency of saturation is produced in parallel processing efficiency of parallel calculation processing using many processors. As a countermeasure of its tendency, the analysis is performed by means of various decomposition methods such as a particle decomposition method, a force decomposition method, and spatial decomposition method. In the following description, unless otherwise noted, the particle behavior analysis using the force decomposition method is performed. A mechanism of performing the particle behavior analysis using the force decomposition method may be similar to the mechanism described in the Patent Document 1, and its description is omitted here.

A particle behavior analysis system 200A is constituted by plural particle behavior analysis devices 202 each having a particle behavior analysis function, which are connected via a network. In each particle behavior analysis device 202, a core part (so-called CPU portion) which performs calculation processing is single in a housing (on a semiconductor substrate).

The particle behavior analysis devices 202 can mutually transfer main processing data through the network 208, can execute particle behavior analysis processing in parallel, and is constituted, as the particle behavior analysis system 200A, as practical parallel type computers (cluster computers). The network 208 is managed in the communication state by a network management device **208*a*** having a routing function.

It is good that each particle behavior analysis device 202 is constituted, as an example, by a computer similar to a general computer. Further, in the example shown in the figure, one of the particle behavior analysis devices 202 constituting the particle behavior analysis system 200A functions a main particle behavior analysis device **202*a* which has a function of a calculation management node that controls the whole. The other particle behavior analysis devices 202 are connected through the network as sub particle behavior analysis devices 202*b* controlled by the main particle behavior analysis device 202*a***

Here, the sub particle behavior analysis devices **202*b* in the exemplary embodiment, which are described later in detail, are divided into a device for a representative node (representative sub particle behavior analysis device 202*b*_1) including a functional part (row-direction processing result output part) which outputs together analysis results obtained, for each row in a force matrix used when the force decomposition method is applied, by the respective sub particle behavior analysis devices 202*b*, and other devices for general nodes (general sub particle behavior analysis device 202*b*_2**).

For convenience, the figure shows a mode in which one network line is derived from the network management device

208*a* and the main particle behavior analysis device 202*a* and the sub particle behavior analysis devices 202*b* are connected to the network line. Actually, however, the respective particle behavior analysis devices 202 are connected to individual ports of the network management device 208*a* to communicate with each other through the network management device 208*a*.

A command input unit 210 such as a keyboard, a mouse and the like for the operator to perform various operations for particle behavior analysis processing, and a display device 212 for presenting the processing result to the operator as image information are connected to the main particle behavior analysis device 202*a*.

Such the system constitution of the basic constitution is adopted, whereby when the particle behavior analysis processing is performed for a system involving plural types of multiparticle interactions, the behavior analysis on each particle interaction of magnetic interaction, electrostatic interaction, and mechanical interaction (contact force; contact force between a wall and particles, or contact force produced by particle-to-particle contact) is executed by the parallel processing by means of the predetermined decomposition method. The mechanical interaction is a contact force between a wall or any other substance and particles or a contact force produced by particle-to-particle contact.

For example, regarding the carrier particles, a magnetic force is calculated by means of a magnetic field analysis method based on a Maxell equation; regarding the toner particles, electrostatic field analysis focusing attention on Coulomb force is performed; further, the contact force between the carrier particles and the toner particles is calculated from the contact amount of particles; and lastly, the acting forces are combined to solve the equation of motion, whereby the behavior of the developer particles 102 is predicted with high accuracy.

Particularly in the exemplary embodiment, when each particle behavior analysis device 202 performs the analysis on each interaction, not a spatial decomposition method (SD), a particle decomposition method (PD), or a replicated data method (RD) but a force decomposition method (an algorithm using a force matrix) is used for analysis, whereby the communication amount of calculation data among all processors (particle behavior analysis devices 202 in the exemplary embodiment) is reduced. By reducing the communication amount of calculation data, paralleling performance of the programs when the multiple processors are used can be enhanced and the calculation time can be shortened greatly.

Though the basic constitution of the particle behavior analysis system 200A shown in FIG. 2 is the constitution of the practical parallel type computers (cluster computers), this constitution is illustrative only. Like the constitution shown in FIG. 3 in the Patent Document which is not illustrated here, plural particle behavior analysis systems each of which is constituted as a parallel type computer in which plural particle behavior analysis devices each having a particle behavior analysis function are connected through a first network may be further connected through another network; a second network. In this case, the particle behavior analysis systems transmit mutually main processing data through an external network (second network), whereby particle behavior analysis processing different from each other in target can be executed in parallel. Such the modified particle behavior analysis system is constituted as a grid type computer in which the practical parallel type computers are connected through a network. Further, each particle behavior analysis system may have a multi-core in which plural core portions (so-called CPU portions) are accommodated in one housing (semiconductor chip).

Particle Behavior Analysis Device: First Constitutional Example

Figure 3A:
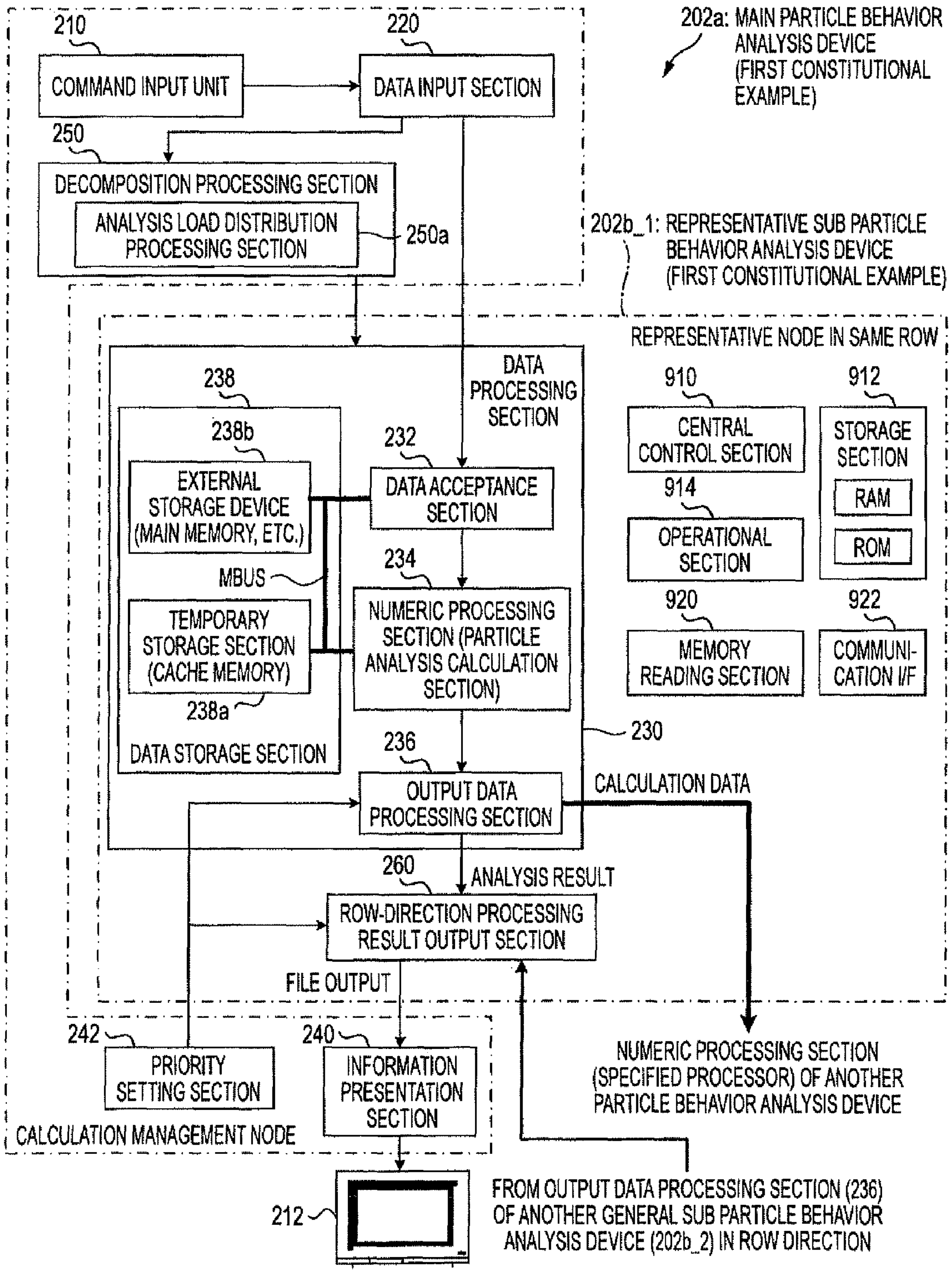
FIG. 3A is a diagram for explaining a first constitutional example of a particle behavior analysis device (in which attention is focused on a main particle behavior analysis device)
Figure 3B:
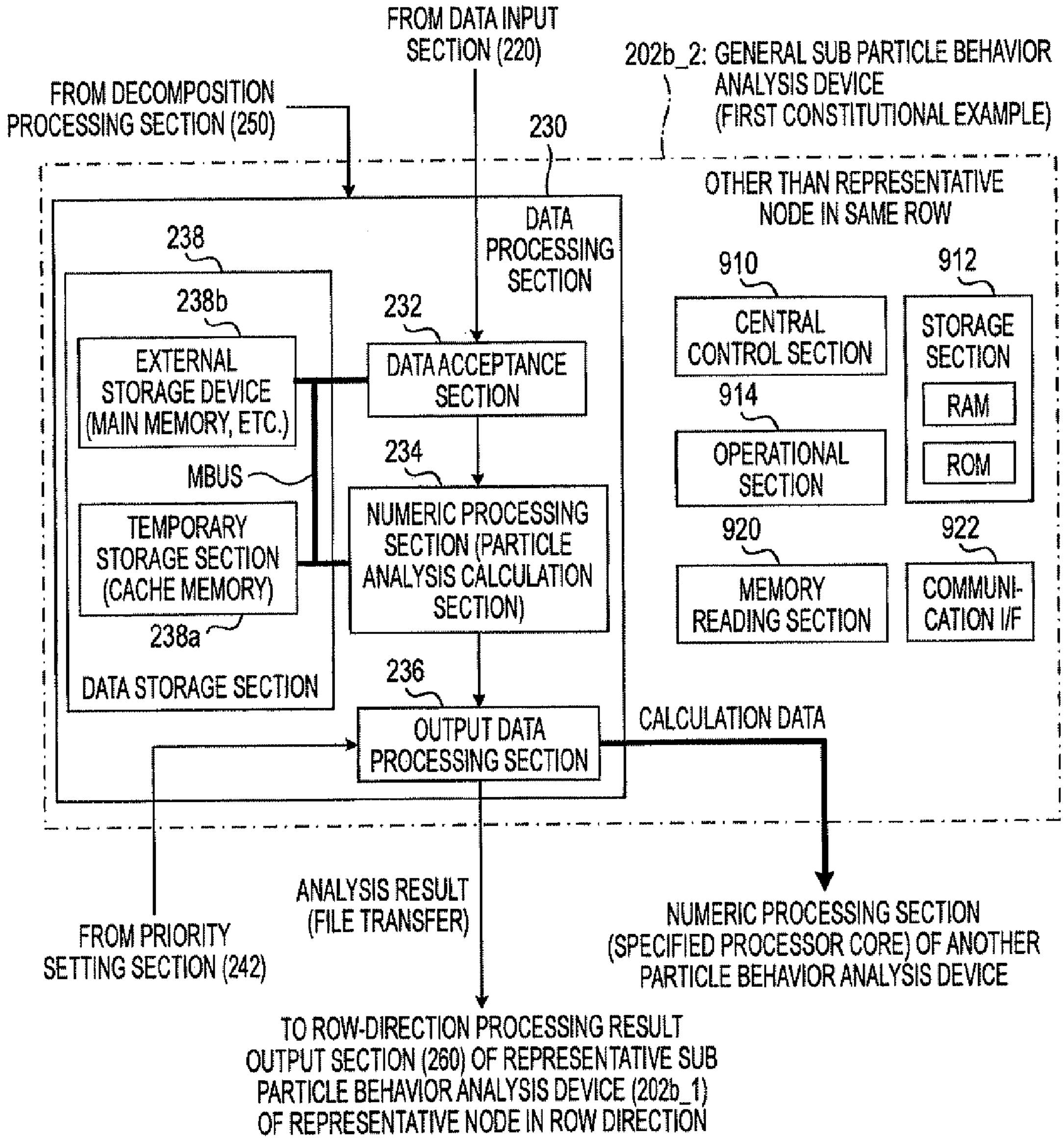
FIG. 3B is a diagram for explaining the first constitutional example of a particle behavior analysis device (in which attention is focused on a sub particle behavior analysis device)

FIGS. 3A and 3B are block diagrams showing a first constitutional example of the particle behavior analysis device 202. Here, FIG. 3 shows the main particle behavior analysis device 202*a* which has particularly the function of a calculation management node (including the representative sub particle behavior analysis device 202*b*_1 of the representative node). FIG. 3B shows the general sub particle behavior analysis device 202*b*_2 including the general node other than the representative node.

As shown in FIG. 3, the main particle behavior analysis device 202*a* includes a data input section 220 for inputting the data to be processed using the command input unit 210, a data processing section 230 which performs particle behavior analysis processing, an information presentation section 240 for presenting a processing result to the operator by means of the display device 212, and a priority setting section 242 for setting to the particle a priority corresponding to output processing of the analysis result. The data input section 220, the information presentation section 240, and the priority setting section 242 are provided for a part corresponding to the calculation management node of the main particle behavior analysis device 202*a*.

Further, the part corresponding to the calculation management node of the main particle behavior analysis device 202*a* is provided with a decomposition processing section 250 which assigns, when an element to be processed is decomposed by the force decomposition method, each decomposed portion to each calculation system (referred to also as a processor, in FIG. 2, the particle behavior analysis device 202) which is constituted by a computer and performs particle behavior analysis by the force decomposition method. The decomposition section 250 is set so as to use an N-N force matrix.

The data input section 220 accepts a command and data inputted by the operator through the keyboard and the mouse which constitute the command input device 210, and passes the required data to the data processing section 230 and the decomposition processing section 250 respectively.

The decomposition processing section 250 is set so as to use an N-N force matrix, and assigns the particle to be analyzed in each force matrix.

It is good that the decomposition processing section 250 considers making calculation loads in the respective nodes nearly equal. For example, the constitution in which an analysis load distribution processing section is provided is adopted. The analysis load distribution processing section distributes elements to be analyzed, when the element to be processed is decomposed by the predetermined decomposition method, so that the calculation time (calculation time per step) at the same range time in the calculation systems (particle behavior analysis systems 200) each constituted by plural computers become equal. This analysis load distribution processing section may be combined by the decomposition processing section 250 (described as an analysis load distribution processing section 250*a*), or may be provided as a functional element different from the decomposition processing section 250.

The analysis load decomposition processing section 250*a* performs decomposition processing which distributes the elements to be analyzed in consideration of difference in acting force between the elements to be analyzed and difference in particle type so that difference in calculation time between numeric processing section (particle behavior calculating sections) become surely small at the parallel analysis time, in case that plural kind of particle interactions such as the electrostatic interaction, the magnetic interaction, the mechanical interaction (contact force), and the adherent force are considered, and also in case that plural types of particles (in this exemplary embodiment, carrier particles, toner particles, and additive) which constitute the developer 102 and are different in physical properties from one another are used as the elements to be analyzed.

Further, it is good that the analysis load distribution processing section 250*a*, also in consideration of processing performances (calculation capacities) of the particle behavior analysis devices 202 constituting the particle behavior analysis system 200, and of the particle behavior analysis systems 200 constituting the particle behavior analysis system 201, distributes the elements to be analyzed. The analysis load distribution processing section 250*a* assigns an area in charge of decomposition and (a group of) particles in charge of decomposition to the calculation systems (particle behavior analysis systems 200) each constituted by the plural computers (particle behavior analysis devices 202). The data processing section 230, while performing data communication with another numeric processor which takes charge of processing on another decomposition part, performs the particle behavior analysis on the decomposed portion of which the section 230 takes charge by the force decomposition method.

In the time of data processing to which the force decomposition method is applied, in consideration of a relation between the particle-to-particle distance and the interaction (distance dependability of interaction), plural cutoff may be set in analysis of a multi-component particle system which uses plural particle types to be analyzed. For example, when the interaction of analysis targets focuses attention on only the interaction between the particles close in distance (referred to as close distance force or short distance force) cutoff is set small; and when the interaction of analysis targets focuses attention on not only the interaction between the particles close in distance but also the interaction between the particles far from each other (referred to as far distance force or long distance force), cutoff is set large.

The data processing section 230 performs particle behavior analysis processing (described later) based on the data inputted from the data input section 220. More particularly, the data processing section 230 has a data acceptance section 232, a numeric processing section 234 (particle behavior calculation section), an output data processing section 236, and a data storage section 238. To the output data processing section 236, the priority information set by the priority setting section 242 is supplied.

The data storage section 238 is a device which stores data in a parameter table for calculating the interaction, and is connected through a memory bus to the numeric processing section 234. Here, the data storage section 238 is composed of a temporary storage part 238*a* and an external storage device 238*b* which are provided for each particle behavior analysis device 202.

The temporary storage part 238*a* is a so-called cache memory contained on the same semiconductor substrate as a substrate of a CPU which a multi-core part 239 includes. The external storage device 238*b* is an external semiconductive storage medium (having capacity of, for example, about several hundreds MB to several GB) referred to also as a so-called main memory or a hard disc device (HDD) that is larger (more than several 100 GB) in capacity than the main memory. As known, the cache memory is speedier than the main memory in access by the CPU.

The data processing section 230 is included in the sub particle behavior analysis device 202*b*. Here, when the main particle behavior analysis device 202*a* corresponds to the representative node, as shown in the figure, the sub particle behavior analysis device 202*b* includes the representative sub particle behavior analysis device 202*b*_1. On the other, when the main particle behavior analysis device 202*a* does not correspond to the representative node, the sub particle behavior analysis device 202*b* includes the general sub particle behavior analysis device 202*b*_2 in place of the representative sub particle behavior analysis device 202*b*_1.

The data acceptance section 232 stores the data inputted from the data input section 220 in the external storage device 238*b* and supplies the required data at the numeric calculation time to the numeric processing section 234. For example, the data concerning the constitution of the development device 40 to be analyzed, and data concerning coordinates and the property values of the developer particle 102 are stored in the external storage device 238*b*.

The numeric processing section 234 functions as a particle behavior calculating section which performs calculation on the decomposition portion assigned by the decomposition processing performed by the decomposition processing section 250 while performing input/output (memory access) of data (information) between the data storage section 238 and the numeric processing section 234 in accordance with the determined decomposition method.

The particle behavior analysis device 202 further includes, as shown in FIG. 3, a row-direction processing result output section 260 in the representative sub particle behavior analysis device 202*b*_1. To the row-direction processing result output section 260, the priority information set by the priority setting section 242 is supplied. The row-direction processing result output section 260 acquires analysis results from the output data processing sections 236 of the general sub particle behavior analysis devices 202*b*_2 in the same row to which the section 260 belongs. Thereafter, the row-direction processing result output section 260, including the analysis result from the self-output data processing section 236, file-outputs collectively the analysis results in the row to the information presentation section 240 of the calculation management node.

Further, as shown in FIG. 3B, the general sub particle behavior analysis device 202*b*_2 is not provided with the row-direction processing result output section 260 in the representative sub particle behavior analysis device 202*b*_1. The output data processing section 236 file-transfers the respective analysis results to the row-direction processing result output section 260 of the representative sub particle behavior analysis device 202*b*_1 in the same row to which the section 236 belongs.

Each numeric processing section 234 analyzes the particle behavior on the developer particles 102 as an example of particles (more particularly, the carrier particles and the toner particles) on the basis of the supplied data by performing simulation processing applying the force decomposition method, considering plural interactions such as magnetic interaction, electrostatic interaction, and mechanical interaction (contact force) at the same time. The numeric processing section 234 supplies an output file of the analysis result to the output data processing section 236 at each predetermined timing.

For example, to begin with, the main particle behavior analysis device 202*a* specifies the number (the number of processors) of the particle behavior analysis devices 202 constituting the particle behavior analysis system 200 that can be used for particle behavior analysis processing at present. Thereafter, calculation conditions of various physical parameters required for calculation, the initial placement of particles, the number of particles to be analyzed required particularly in the force decomposition method, and the like are read. The specified particle behavior analysis devices 202 (processors) are placed as a matrix in accordance with the force decomposition method, and the particles to be analyzed (the carrier particles and the toner particles constituting the developer 102) are assigned.

Next, plural types of multiparticle interaction forces are distributed among the specified processors (other numeric processing sections 234) and calculation is performed. At this time, for the plural type of multiparticle interactions, different force matrixes are used for calculation. For example, the magnetic interaction with the mated particle in the matrix in charge is analyzed using the force matrix for magnetic interaction analysis. Next, the specific processors perform communication through the output data processing section 236 between each other, thereby to find the sum total of the magnetic interaction forces calculated in the distributed manner for the magnetic interaction.

Similarly, the electrostatic interaction with the mated particle in the matrix in charge is analyzed using the force matrix for electrostatic interaction analysis. Next, the specific processors perform communication through the output data processing section 236 between each other, thereby to find the sum total of the electrostatic interaction forces calculated in the distributed manner for the electrostatic interaction.

Further, the mechanical interaction (contact force) with the mated particle in the matrix in charge is analyzed using the force matrix for mechanical interaction analysis. Next, the specific processors perform communication through the output data processing section 236 between each other, thereby to find the sum total of the mechanical interaction forces calculated in the distributed manner for the mechanical interaction.

Further, the sum totals found respectively for the magnetic interaction, the electrostatic interaction, and the mechanical interaction (contact force) are added together thereby to find the total of the sum totals. Next, using the total of the sum totals of the magnetic interaction, the electrostatic interaction, and the mechanical interaction (contact force), the equation of motion of each particle is solved and the position coordinates are calculated. The position coordinates of each particle thus found are sent to the specific processor (numeric processing section 234) relating to the interaction matrix, and calculation information is updated. Thereafter, the similar processing is repeated up to a predetermined calculation step.

The output data processing section 236 performs delivery of the calculation data in each calculation step between each numeric processing section 234 and the section 236. In addition, the output data processing section 236 receives an output file of the calculation result in the numeric processing section 234 from another predetermined particle behavior analysis device 202 (numerical processing section 234) (a device in the row direction of the force decomposition method in this example), and passes the output file to the information presentation section 240. The information presentation section 240 collects the data from the particle behavior analysis devices 202, converts the collected data into display data, and supplies the display data to the display device 212. The display device 212 displays a processing result image on the basis of the display data supplied from the information presentation section 240. Prediction of behavior of the developer particle 102 is made visible so that the behavior of the developer particle 102 which is difficult to actually confirm can be visually confirmed and the prediction is displayed on the display device 212.

The processor does not only function as the numeric processing section 234 but can realizes functions of the general CPU such as other general arithmetic processing functions and a control function. The sub particle behavior analysis device 202*b* is provided also with the constitution similar to the constitution of the general computer as a mechanism for making the CPU function as each function part by program processing, and constitutes a computer system.

In the exemplary embodiment, the mechanism for analyzing the particle behavior is constituted not only by a hardware processing circuit, but also by software using a computer on the basis of a program code for realizing the functions. Therefore, a program referred for realizing the mechanism according to the exemplary embodiment by software using a computer or a computer-readable recording medium (storage medium) storing his program can be extracted as the invention. By adopting the mechanism of executing particle behavior analysis processing by software, the processing procedure is readily changed without involving change in the hardware.

A series of particle behavior analysis processing can be realized not only by one of hardware and software but also by combination of them. In case that processing by software is executed, a program indicating a processing procedure is installed in a storage medium in a computer built in hardware and executed, or a program is installed in a general-purpose computer which can execute various processing and executed.

A program for causing a computer to execute the particle behavior analysis processing function is distributed through a recording medium such as a CD-ROM. Alternatively, this program may be stored not in the CD-ROM but in an FD. Further, an MO drive may be provided for storing the program on an MO disk, or the program may be stored on any other storage mediums such as nonvolatile semiconductor memory card of a flash memory.

The program of configuring the software may be provided not only through a storage medium, but also through a wire or wireless communication network. For example, the program may be downloaded and acquired through a network such as Internet from another server, or may be updated. The program is provided as a file describing a program code for implementing the particle behavior analysis processing function. In this case, the program may be provided not only as a batch program file, but also as separate program modules in response to the hardware configuration of the system configured by the computer.

For example, a computer system includes a central control section 910 in which a processor core operates, a storage section 912 provided with a ROM (Read Only Memory) of read-only storage section or a RAM (Random Access Memory) which allows writing and reading at any time, an operational section 914, and not-shown other peripheral members. In the ROM, a control program for particle behavior analysis processing function and the like are stored. The operational section 914 is a user interface for receiving an operation by a user.

As a control system of the computer system, the computer system may be configured so that a not-shown external storage medium such as a memory card can be detachably inserted or so that connection with a communication network such as Internet is possible. Therefore, it is good that the control system includes, in addition to the central control section 910 and the storage section 912, a memory reading section 920 for reading information of a portable type recording medium and a communication I/F 922 as a communication interface means with the outside. By providing the memory reading section 920, the program can be installed or updated from the external recording medium. By providing the communication I/F 922, the program can be installed or updated through the communication network.

The concrete means of each section (including each functional block) in the information processing system for implementing particle behavior analysis processing in the exemplary embodiment may use hardware, software, communication means, combination of them, or other means, which is obvious to those skilled in the art. Further, the functional blocks may be compounded to be collected in one functional block. Further, the software which makes the computer execute the program processing can be installed in a distribution manner according to the form of combination.

Particle Behavior Analysis Device: Second Constitutional Example

Figure 3C:
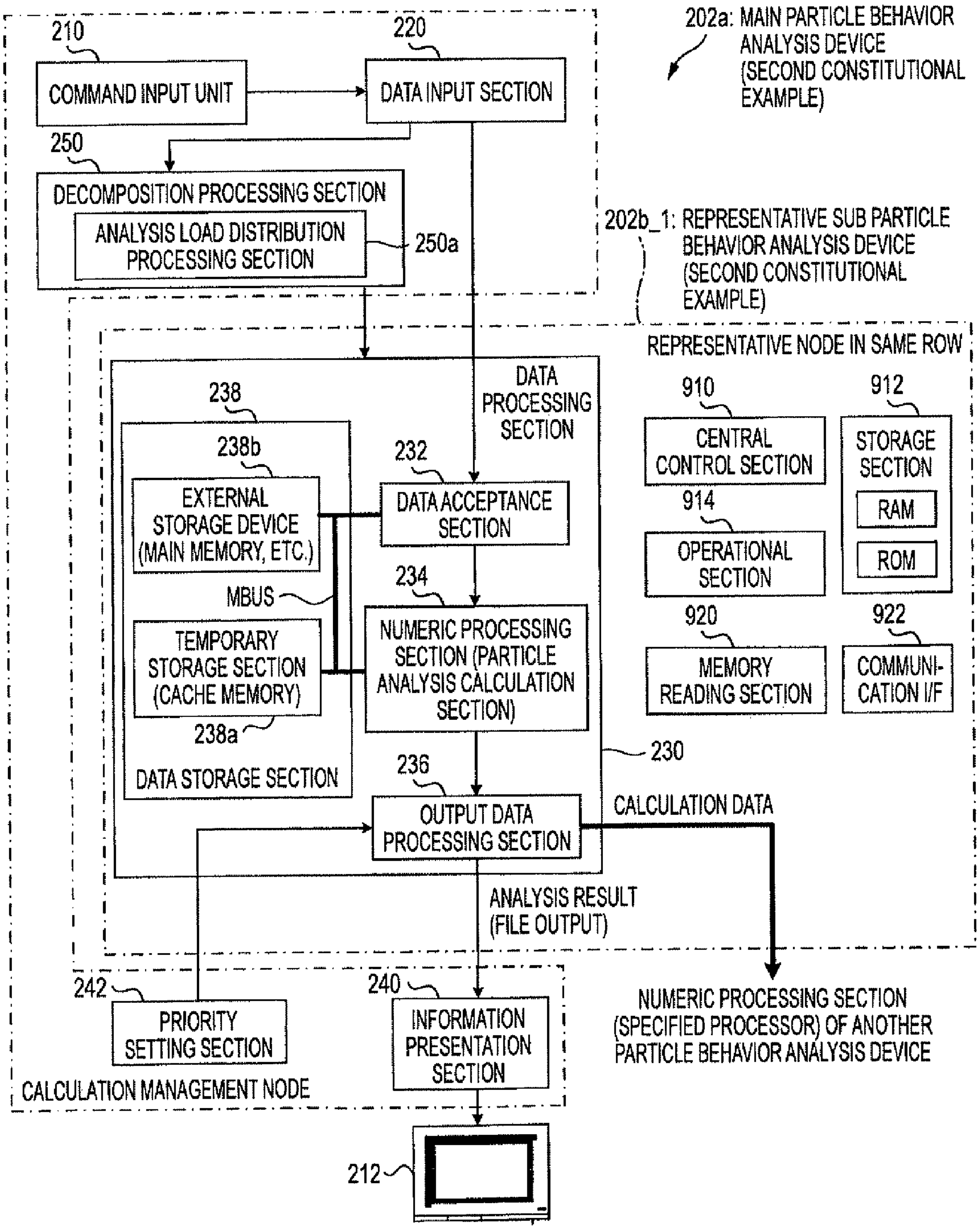
FIG. 3C is a diagram for explaining a second constitutional example of a particle behavior analysis device (in which attention is focused on a main particle behavior analysis device)
Figure 3D:
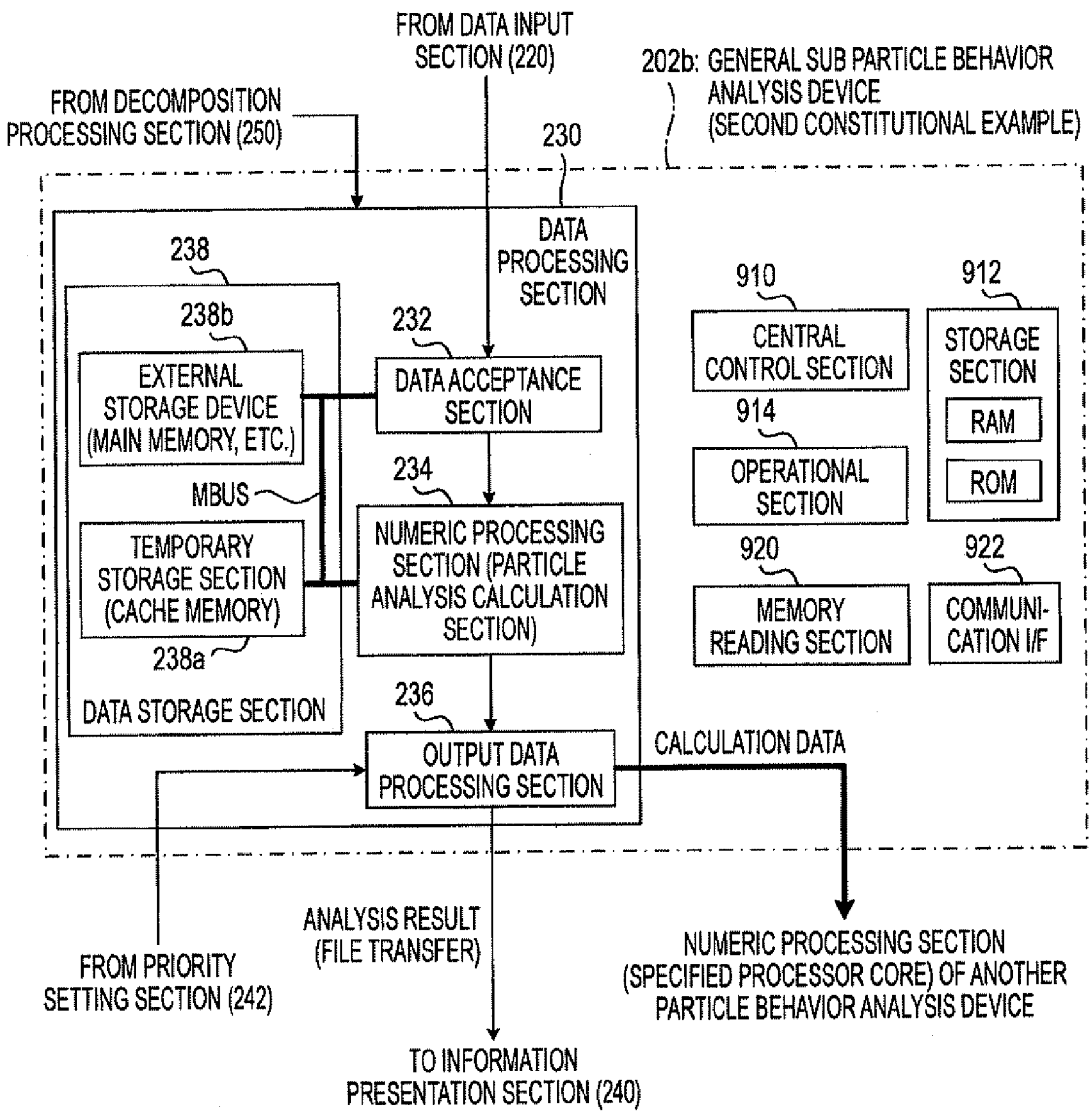
FIG. 3D is a diagram for explaining the second constitutional example of a particle behavior analysis device (in which attention is focused on a sub particle behavior analysis device)

FIGS. 3C and 3D are diagrams for explaining a second constitutional example of the particle behavior analysis device 202. Here, FIG. 3C is a block diagram which focuses attention particularly on the main particle behavior analysis device 202*a* having the function of the calculation management node. FIG. 3D is a block diagram which focuses attention on the sub particle behavior analysis device 202*b* having the function of the general node. The main particle behavior analysis device 202*a* includes the sub particle behavior analysis device 202*b*.

In the second constitutional example of the particle behavior analysis device 202, the row-direction processing result output section 260 is removed from the first constitutional example. Therefore, the numeric processing sections 234 perform individually the file output without using the row-direction processing result output section 260. Actually, any one of the particle behavior analysis devices 202 collects the output files of the other particle behavior analysis devices 202 and file-outputs them to the information presentation section 240. Other points are similar to those in the first constitutional example.

[Problems on File Output Processing]

Figure 4A:
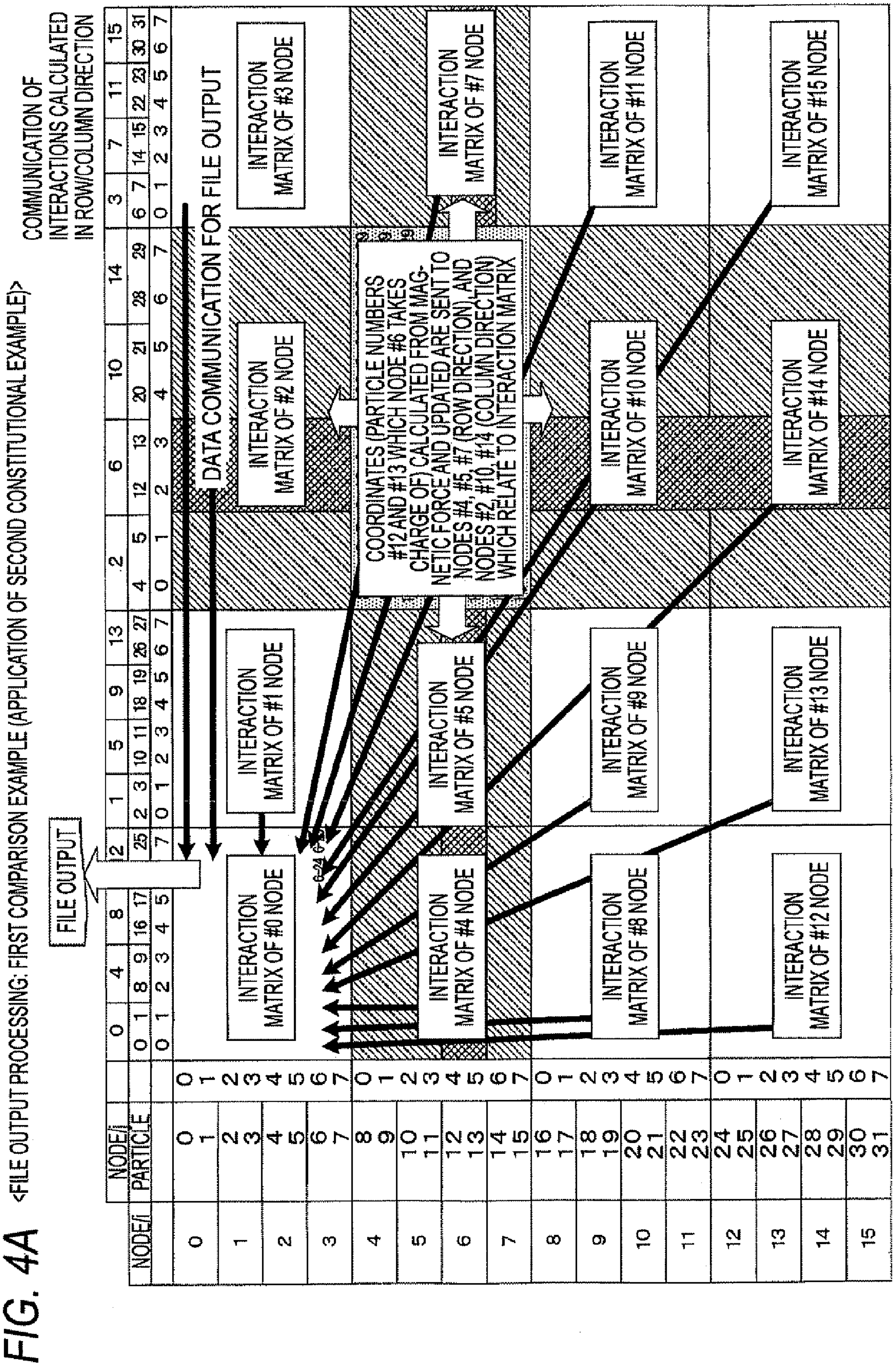
FIG. 4A is a diagram for explaining file output processing in case the particle behavior analysis device in the second constitutional example is applied.
Figure 4B:
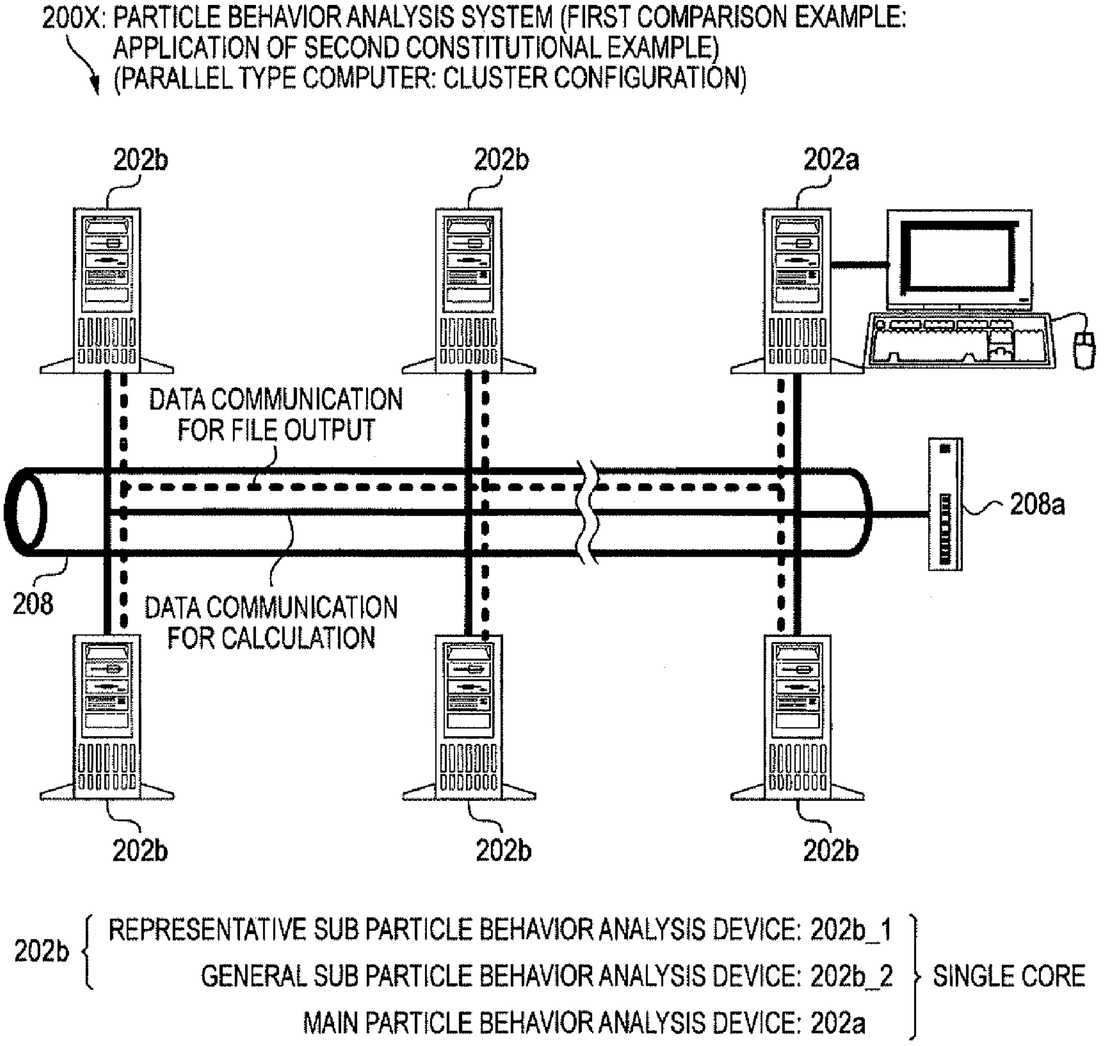
FIG. 4B is a diagram for explaining file output processing in case the particle behavior analysis device in the second constitutional example is applied.
Figure 4C:
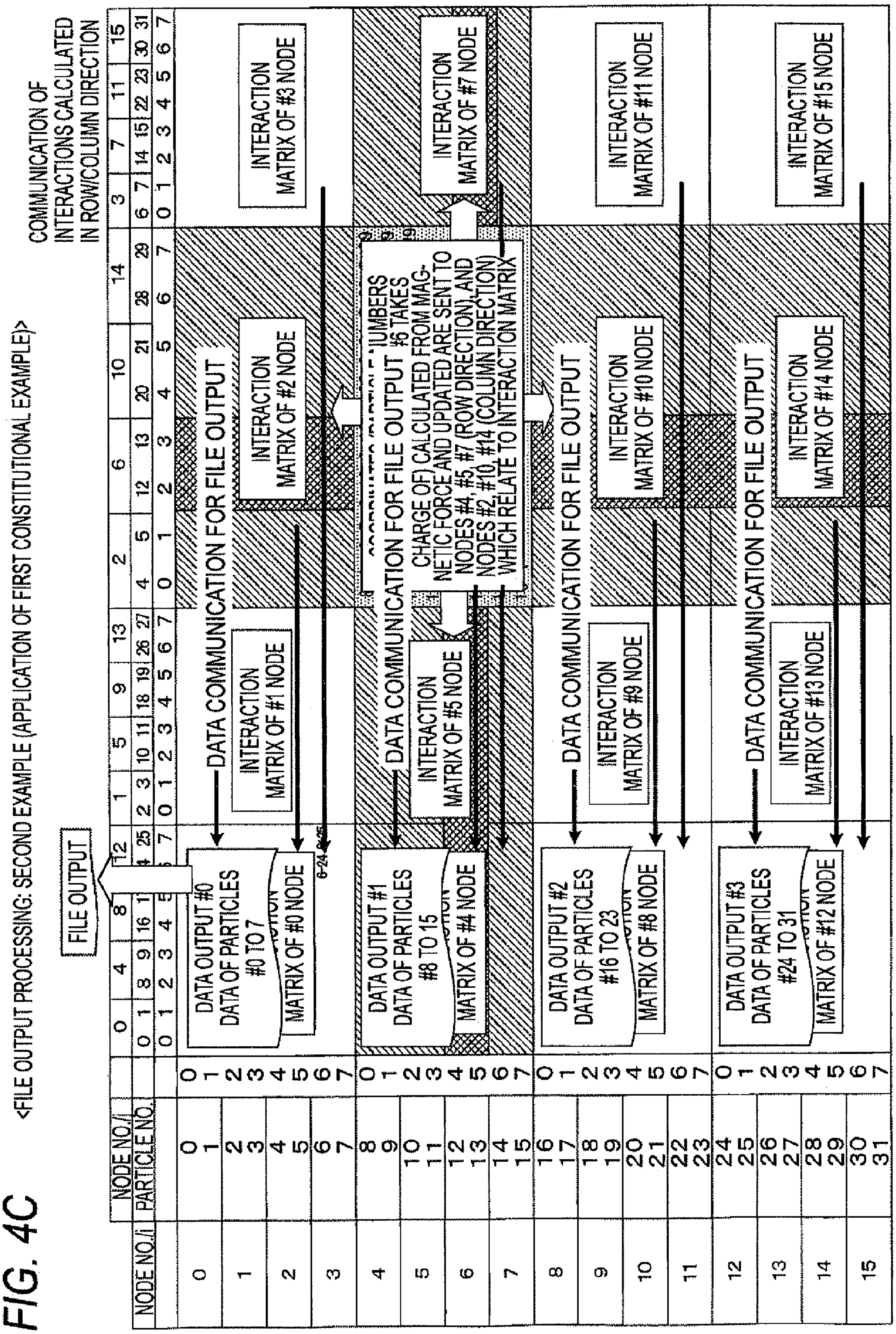
FIG. 4C is a diagram for explaining file output processing in case that the particle behavior analysis device in the first constitutional example is applied.
Figure 4D:
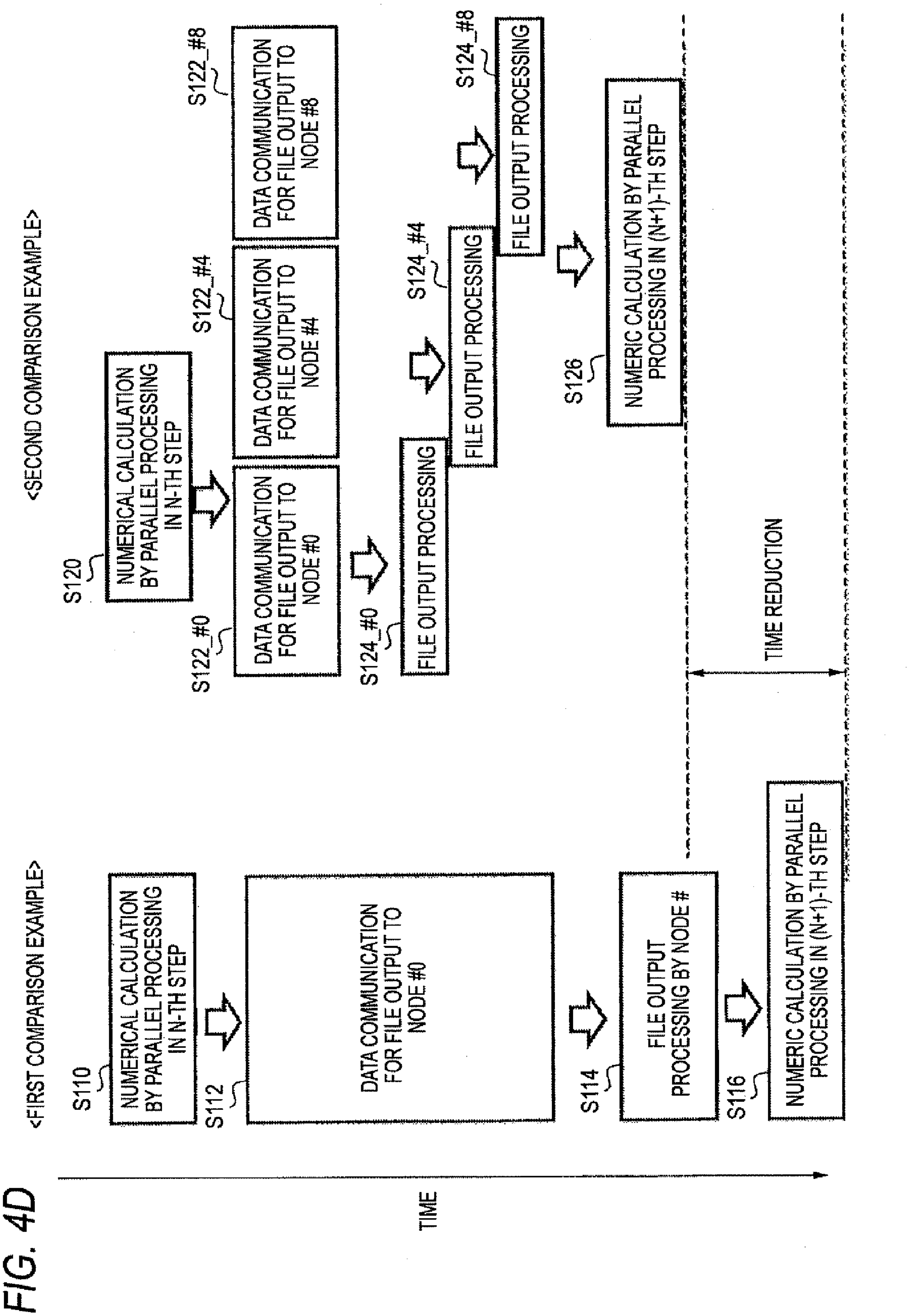
FIG. 4D is a diagram for explaining comparison of file output processing between a first comparison example and a second comparison example.

FIGS. 4A to 4D are diagrams for explaining problems on file output processing which outputs an analysis result acquired in each node in the force decomposition method in compared examples to which the exemplary embodiment is not applied. Here, FIGS. 4A and 4B are diagrams for explaining file output processing in case that the particle behavior analysis device 202 in the second constitutional example is applied. FIG. 4C is a diagram for explaining file output processing in case that the particle behavior analysis device 202 in the first constitutional example is applied. FIG. 4D is a diagram for explaining comparison of file output processing between a first comparison example and a second comparison example.

Example of Processing: First Comparison Example

Firstly, the first comparison example (FIGS. 4A to 4B) in case that the particle behavior analysis device 202 in the second constitutional example is applied will be described. Herein, an example of processing in case that parallel calculation on 32 particles is performed by 16 processors (16 particle behavior analysis devices 202: described as 16 CPU's) is shown.

For example, in case that multi-particle interaction such as long distance force or short distance force is calculated, the particle behavior analysis is performed using not the spatial decomposition method but the force decomposition method, whereby the analysis processing time is reduced. However, in case of the particle behavior analysis using such the force decomposition method, particle information (coordinates) is communicated for each step in order to calculate the short distance force. Therefore, compared with the case where the spatial decomposition method is used, a communication load becomes large and high parallelization performance is not obtained.

It is not limited to the force decomposition method that the parallel processing by the plural computers using the force decomposition method makes the communication load large. As a general problem in the parallel processing, in case that the plural processors are used, a ratio of calculation data communication time to the total processing time increases according to the parallel number, and an advantage of parallelization is saturated.

The numeric processing section 234 of each node supplies a processing result (analysis result) of the particle behavior analyzed by the simulation processing applying the force decomposition method to the output data processing section 236. The output data processing sections 236 of the respective nodes, for the purpose of file out of their analysis results, transfers their analysis results to the output data processing section 236 of any one (herein, main particle behavior analysis device 202*a*) of the calculation nodes constituting the force matrix. The output data processing section 236 of the sub particle analysis device 202*b* constituting the main particle behavior analysis device 202*a* file-outputs its self-analysis result together with the analysis results of other sub particle behavior analysis devices 202*b*.

Namely, as shown in FIG. 4A, in parallel processing by the force decomposition in a particle behavior analysis system 200X in the compared example, one calculation node (CPU) file-outputs collectively the analysis results of the respective particle behavior analysis devices 202, so that not only the communication load of calculation data but also the communication load of file output data is applied on its calculation node, and a large overhead is produced. Therefore, it takes longer time for this calculation node to perform the behavior analysis processing than for other calculation nodes. Since this influence is exerted on the whole of the particle behavior analysis system 200, the behavior analysis requires the long processing time as a whole.

Further, as shown in FIG. 4B, a band of a communication line (network 208) connecting between the calculation nodes (particle behavior analysis devices 202) in the particle behavior analysis system 200X in the compared example is used by both of calculation data and file output data. Since a calculation data communication band exerting a large influence on calculation speed is used also in communication of the file output data, lowering of parallel calculation performance is produced. In result, the behavior analysis processing time becomes long.

Example of Processing: Second Comparison Example

On the other hand, in the second comparison example (FIG. 4C) in which the particle behavior analysis device 202 in the first constitutional example is applied, attention is focused on property of the force matrix used in the force decomposition method, and a method capable of reducing the communication load of the file output (file writing processing) more than the related method is adopted. Specifically, for each row direction of the force matrix, the analysis results obtained by the particle behavior analysis devices 202 are collectively file-outputted. Namely, in the parallel processing using the force matrix, when the file output is performed, the communication is performed in the parallel calculation elements (particle behavior analysis devices 202) in the same row in order to collect the file output data, and the file output processing is performed for each row.

According to which node (CPU, particle behavior analysis device 202) is put in charge of file output processing for each row, various system modes can be adopted. In the first exemplary embodiment, the node which takes charge of this file output is set to any of the particle behavior analysis devices 202 belonging to the row constituting the force matrix. Of such the nodes constituting the force matrix, a node which file-outputs collectively the analysis results of one row is particularly referred to as a representative node, and the particle behavior analysis device 202 of the representative node is taken as a representative sub particle behavior analysis device 202*b*_1. Other particle behavior analysis devices 202 than the representative sub particle behavior analysis device 202*b*_1 are referred to as general sub particle behavior analysis devices 202*b*_2.

The numeric processing section 234 of each node supplies the processing result (analysis result) of the particle behavior analyzed by the simulation processing applying the force decomposition method to the output data processing section 236. Of the sub particle behavior analysis devices 202*b* of each row constituting the force matrix, the output data processing sections 236 of the general sub particle behavior analysis devices 202*b*_2 (general nodes) except the representative sub particle behavior analysis device 202*b*_1 (representative node) sends their analysis results, for the purpose of file output of the analysis results, to the row-direction processing result output section 260 of the representative sub particle behavior analysis device 202*b*_1 in the same row.

The row-direction processing result output section 260 of the representative sub particle behavior analysis device 202*b*_1 gets the analysis result from the self output data processing section 236 together with the analysis results from the general sub particle behavior analysis devices 202*b*_2, and file-outputs their analysis results to the information presentation section 240 of the calculation management node. Namely, in file output processing in the first exemplary embodiment, the output data are communicated in the row direction of the force matrix, and each representative node performs the file output.

The representative node (representative sub particle behavior analysis device 202*b*_1) of each row, in the output file relating to its row, outputs the analysis results in order of the particle number. Namely, the file output of the analysis data is performed in order of particle number. The representative nodes (representative sub particle behavior analysis devices 202*b*_1) of the respective rows file-output sequentially the analysis results in the respective row.

Figure 5A:
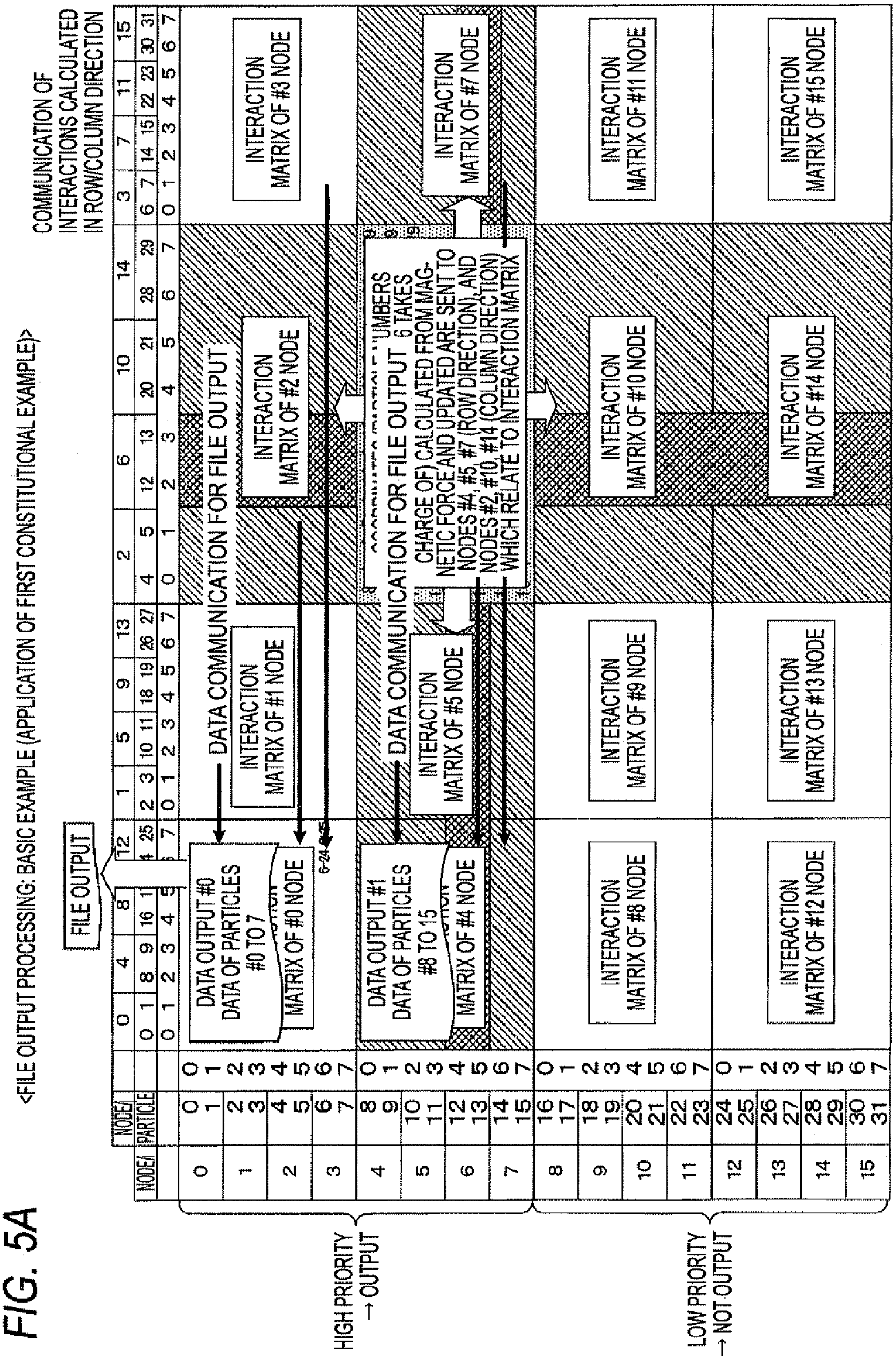
FIG. 5A is a diagram for explaining a basic principle of file output processing in the exemplary embodiment in case that the particle behavior analysis device in the first constitutional example is applied.

As combination between assignment of the representative node in each row and the order of file output from the representative node in each row, various combinations can be adopted. FIG. 5A shows a most preferred example, in which the representative nodes in the respective rows are located in the same position in the column direction of the force matrix. In the shown example, a node #0 takes charge of data output #0 (data of particles #0-7) in 0-th row. Therefore, between the output data processing part 236 of a node #1 and the row-direction processing result output section 260 of the node #0, data communication for file output on particles #2 and 3 is performed. Between the output data processing part 236 of a node #2 and the row-direction processing result output section 260 of the node #0, data communication for file output on particles #4 and 5 is performed. Between the output data processing part 236 of a node #3 and the row-direction processing result output section 260 of the node #0, data communication for file output on particles #6 and 7 is performed. Hereby, in the node #0, the analysis results on the particles #0-7 including the particles #0, 1 which the node #0 takes charge of are collected.

Further, a node #4 takes charge of data output #1 (data of particles #8-15) in the second row. Therefore, between the output data processing part 236 of a node #5 and the row-direction processing result output section 260 of the node #4, data communication for file output on particles #10 and 11 is performed. Between the output data processing part 236 of a node #6 and the row-direction processing result output section 260 of the node #4, data communication for file output on particles #12 and 13 is performed. Between the output data processing part 236 of a node #7 and the row-direction processing result output section 260 of the node #4, data communication for file output on particles #14 and 15 is performed. Hereby, in the node #4, the analysis results on the particles #8-15 including the particles #8, 9 which the node #4 takes charge of are collected.

Further, a node #8 takes charge of data output #2 (data of particles #16-23) in the second row. Therefore, between the output data processing part 236 of a node #9 and the row-direction processing result output section 260 of the node #8, data communication for file output on particles #18 and 19 is performed. Between the output data processing part 236 of a node #10 and the row-direction processing result output section 260 of the node #8, data communication for file output on particles #20 and 21 is performed. Between the output data processing part 236 of a node #11 and the row-direction processing result output section 260 of the node #8, data communication for file output on particles #22 and 23 is performed. Hereby, in the node #8, the analysis results on the particles #16-23 including the particles #16, 17 which the node #8 takes charge of are collected.

Further, a node #12 takes charge of data output #2 (data of particles #24-31) in the third row. Therefore, between the output data processing part 236 of a node #13 and the row-direction processing result output section 260 of the node #12, data communication for file output on particles #26 and 27 is performed. Between the output data processing part 236 of a node #14 and the row-direction processing result output section 260 of the node #12, data communication for file output on particles #28 and 29 is performed. Between the output data processing part 236 of a node #15 and the row-direction processing result output section 260 of the node #12, data communication for file output on particles #30 and 31 is performed. Hereby, in the node #12, the analysis results on the particles #24-31 including the particles #24, 25 which the node #12 takes charge of are collected.

Each row-direction processing result output section 260, so that the information presentation section 240 can perform smoothly information presentation on the basis of the analysis result in each node in its row, performs sequentially the file output in order in which the data is arranged in order of the particle number, in the output file which each section 26 takes charge of Further, each row-direction processing result output section 260 may perform the file output in order in which the analysis results are not arranged in order of particle number, for example, in order of data output #0, data output #2, data output #3, and data output #1. Preferably, each row-direction processing result output section 260, so that the information presentation section 240 can perform smoothly the information presentation on the basis of the analysis results in all the nodes, performs the file output in order in which the analysis results are arranged in order of particle number also in the column direction, for example, in order of data output #0, data output #1, data output #2, and data output #3.

Though illustration is omitted, the representative nodes in the rows may be located in the different positions from one another in the column direction of the force matrix. For example, the node #0 takes charge of the data output #0 in the 0-th row (data of particles #0-7), the node #5 takes charge of the data output #1 in the first row (data of particles #8-15), the node #10 takes charge of the data output #2 in the second row (data of particles #16-23), and the node #15 takes charge of the data output #3 in the third row (data of particles #24-31). Also in this case, preferably, each row-direction processing result output section 260 performs the file output in order in which the analysis results are arranged in order of particle number also in the column direction.

Comparison between First Comparison Example and Second Comparison Example, and Problems FIG. 4D shows comparison between the first comparison example and the second comparison example. In the file output processing in the first comparison example, each calculation node, after performing the numeric calculation by parallel processing on the N-th step (S110), performs the data communication for the file output with the node #0 (S112). Thereafter, the node #0 file-outputs collectively all the calculation results including the self calculating result (S114). Thereafter, each calculation node performs the numeric calculation by parallel processing in the (N+1)-th step (S116), and so on.

On the other hand, in the file output processing in the second comparison example, each calculation node performs the numeric calculation by parallel processing on the N-th step (S120). Thereafter, for the respective rows, data communication for the file output are performed in parallel with the respective representative nodes (S122). For example, other calculation nodes (#1-#3) in the same row as the row of the node #0 perform the data communication for the file outputs with the node #0 (S122_#0). Other calculation nodes (#5-#7) in the same row as the row of the node #4 perform the data communication for the file outputs with the node #4 (S122_#4). Other calculation nodes (#9-#11) in the same row as the row of the node #8 perform the data communication for the file outputs with the node #8 (S122_#8). Other calculation nodes (#13-#15) in the same row as the row of the node #12 perform the data communication for the file outputs with the node #12 (S122_#12), which is not shown.

Thereafter, each representative node file-outputs collectively the calculation results in the same row including the self calculation result in order (124). For example, the node #0 file-outputs collectively the calculation results in the calculation nodes (#0-#3) including the self calculation result (S124_#0). Thereafter, the node #4 file-outputs collectively the calculation results in the calculation nodes (#4-#7) including the self calculation result (S124_#4). Thereafter, the node #8 file-outputs collectively the calculation results in the calculation nodes (#8-#11) including the self calculation result (S124_#8). Thereafter, the node #12 file-outputs collectively the calculation results in the calculation nodes (#12-#15) including the self calculation result, which is not shown (S124_#12).

Thereafter, each calculation node performs the numeric calculation by parallel processing in the (N+1)-th step (S126), and so on.

Thus, in the file output processing in the second comparison example, for each row of the force matrix, any of the calculation nodes constituting the force matrix is taken as a representative node, the output data are communicated in the row direction of the force matrix, and the representative nodes in the respective rows perform sequentially the file output. Namely, the first exemplary embodiment is different, in that the file output processing is performed by the plural representative nodes in a distribution manner, from the comparison example in which the file output processing is performed by one node in a concentrated manner. Hereby, compared with the comparison example in which one node receives the file output data from the other 15 calculation nodes and file-outputs collectively the data of the 16 nodes, since the communication of the 3 node data is performed per representative node, the communication waiting time is reduced. Further, the file outputs are sequentially performed by the representative nodes in order in which the data are arranged in order of particle number, so that the file output processing time performed by each node is also reduced.

As the whole, since the overhead in the file output is reduced, even if the file output interval is made small (even under a condition of file output with high frequency), delay of the behavior analysis processing is suppressed.

Further, since the node for performing the file output processing in each row is, in the second comparison example, any of the nodes in a row in each row direction of the force matrix, the second comparison example is not different in system scale from the comparison example (related example). Even if the system scale is not increased, lowering of processing efficiency caused by the fact that any one of the nodes constituting the force matrix performs collectively the file outputs of all the nodes is prevented.

Here, in the file output processing in the first and second comparison examples, the processing results on all the particles are outputted. Namely, the output data file of the calculation results includes data of all the particles. The calculation results in the large-scaled simulation are file-outputted for all the particles, and they are made into a large capacity of file including much information. Therefore, the file output time increases, with the result that the entire particle behavior analysis time increases.

However, the actual particle behavior analysis does not require the data file for all the particles. For example, though the information on all the particles is required for calculation in the behavior analysis and the data communication is required among the processors, when the data analysis work is performed on the basis of the data file, for example, when the data file is sent to the information presentation section 240 and a state of behavior of attention particles is displayed on the display device 212 to track only the behavior of the attention particles, or when only the behavior data of the attention particles is stored, it is enough that there is only data on the attention particle. In this case, for the output of a data file on all the particles, it takes much useless output processing time, because the calculation result file includes also the information unused in data analysis work, and output processing of the unused (or unnecessary) data is also performed. Namely, depending on the purpose of analysis, the output processing is performed also for the unused data, and the useless time increases.

<Improvement Method: Basic Principle>

Figure 5B:
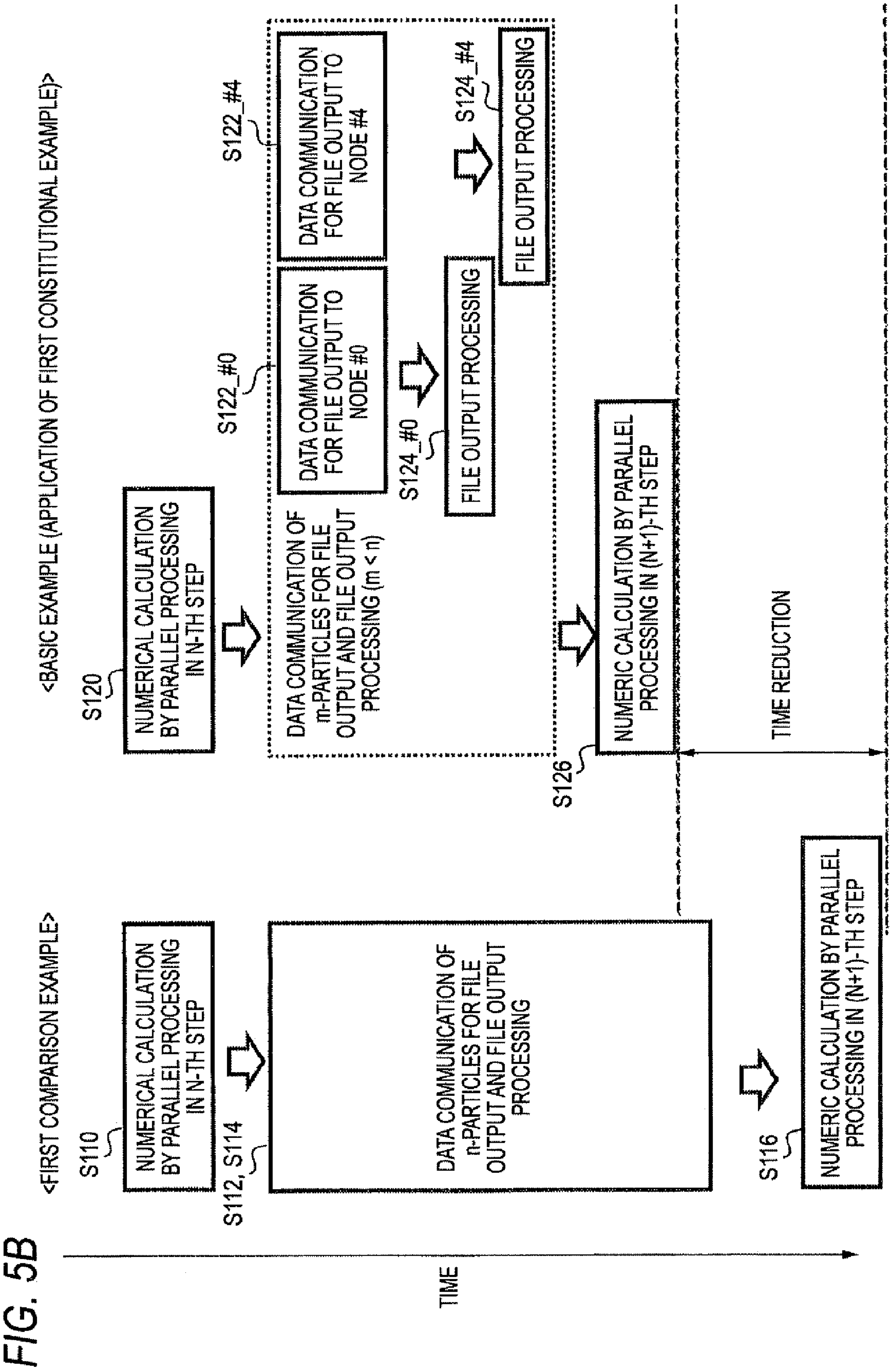
FIG. 5B is a diagram for explaining comparison in each file output processing between the first comparison example in which the particle behavior analysis device in the second constitutional example is applied and the exemplary embodiment in which the particle behavior analysis device in the first constitutional example is applied.
Figure 5C:
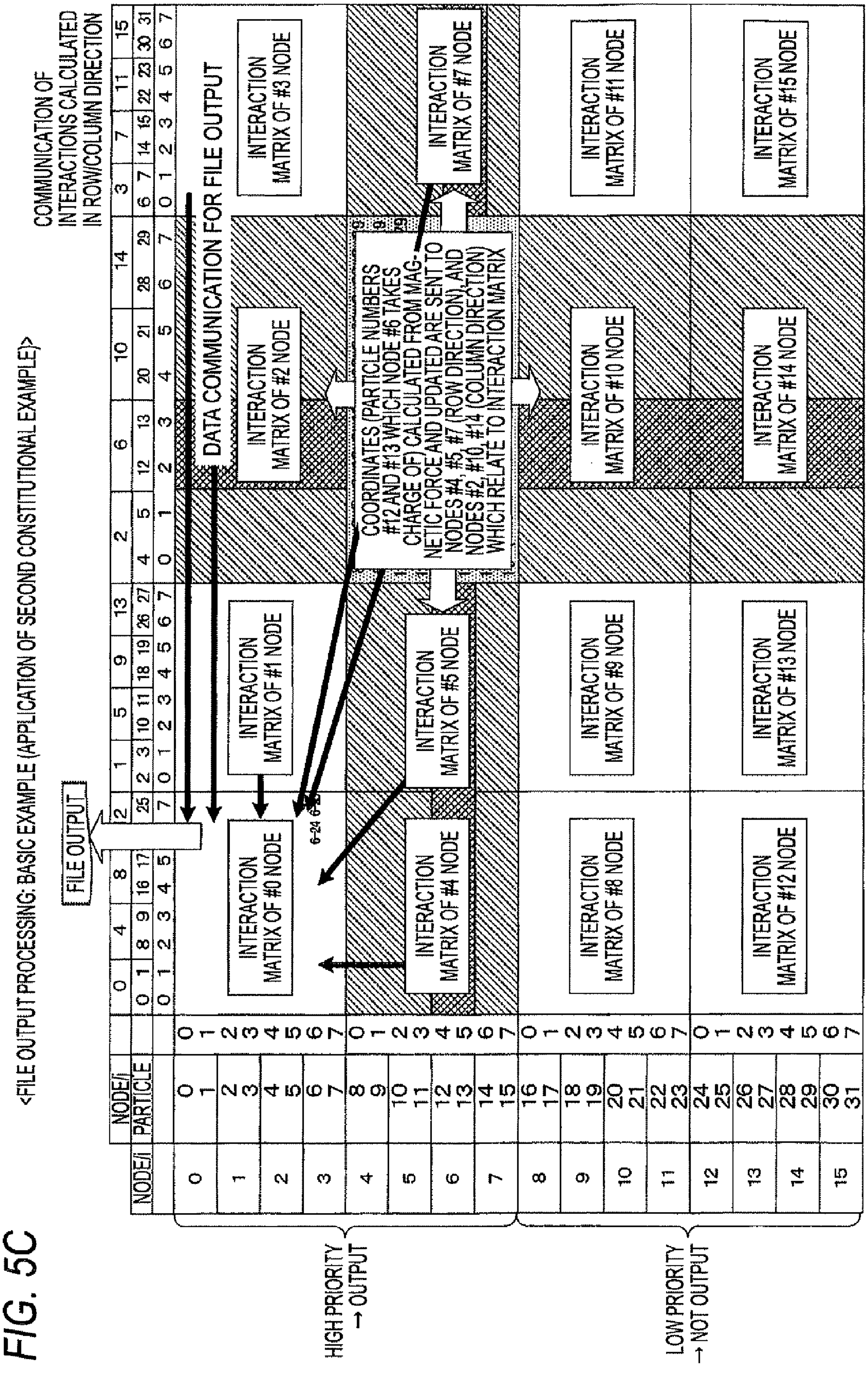
FIG. 5C is a diagram for explaining a basic principle of file output processing in the exemplary embodiment in case that the particle behavior analysis device in the second constitutional example is applied.
Figure 5D:
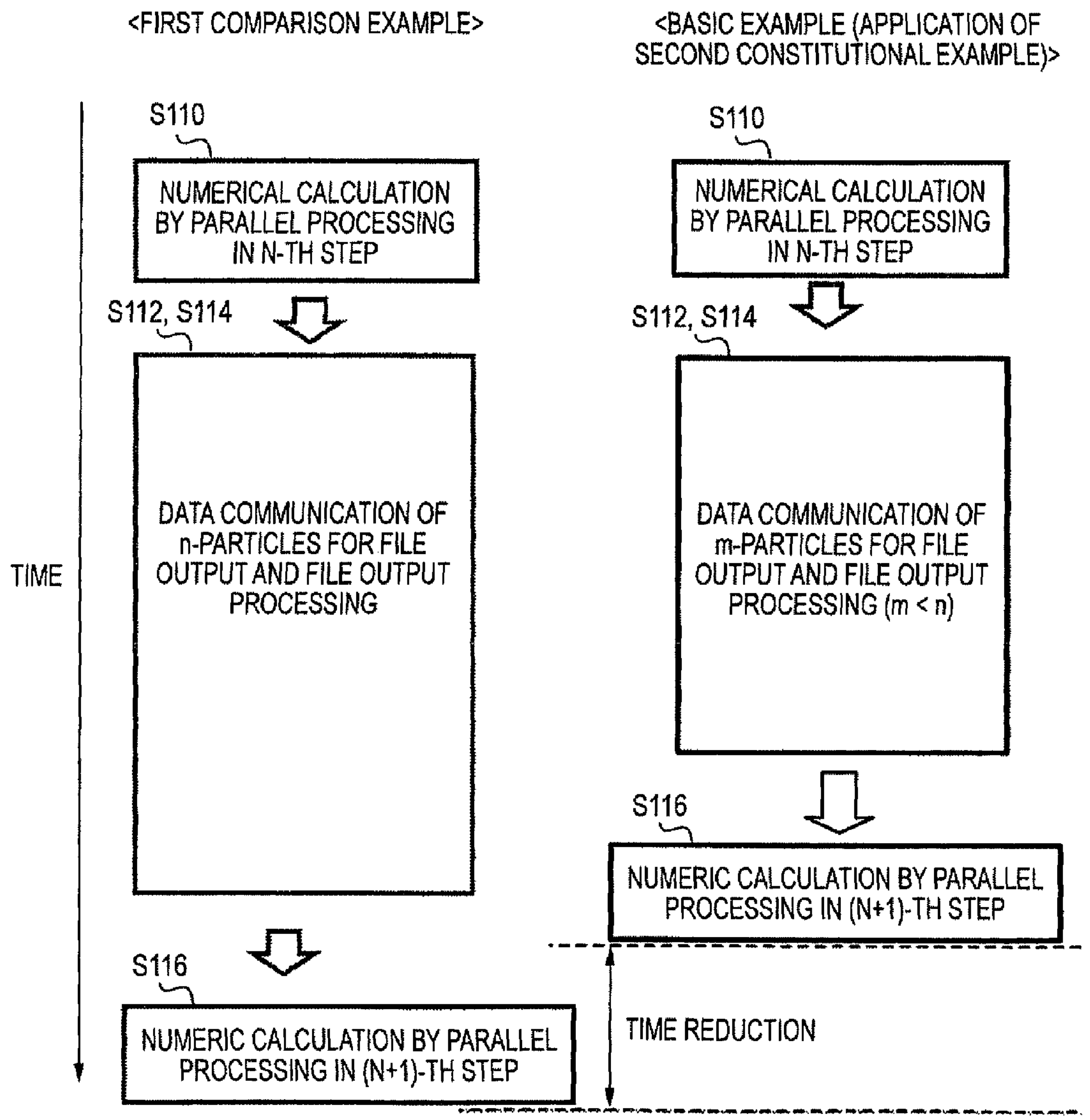
FIG. 5D is a diagram for explaining comparison in file output processing between the first comparison example in which the particle behavior analysis device in the second constitutional example is applied and the exemplary embodiment in which the particle behavior analysis device in the second constitutional example is applied.

FIGS. 5A to 5D are diagrams for explaining a basic principle of file output processing of the particle behavior analysis system 200A in the exemplary embodiment. Here, FIG. 5A is a diagram for explaining a basic principle of file output processing in the exemplary embodiment in case that the particle behavior analysis device 202 in the first constitutional example is applied. FIG. 5B is a diagram for explaining comparison in file output processing between the first comparison example to which the particle behavior analysis device 202 in the second constitutional example is applied and the exemplary embodiment to which the particle behavior analysis device 202 in the first constitutional example is applied. FIG. 5C is a diagram for explaining a basic principle of file output processing in the exemplary embodiment in case that the particle behavior analysis device 202 in the second constitutional example is applied. FIG. 5D is a diagram for explaining comparison in file output processing between the first comparison example to which the particle behavior analysis device 202 in the second constitutional example is applied and the exemplary embodiment to which the particle behavior analysis device 202 in the second constitutional example is applied.

In file output processing in the exemplary embodiment, only the required data is outputted, whereby efficient file output processing is realized. In sharp distinction of the "required data", the priority setting section 242 assigns a priority corresponding to execution/inexecution of file output processing to particles, and the output data processing section 236 and the row-direction processing result output section 260 determine, on the basis of the assigned priority, whether the particle is taken as a target of the file output or not. A priority corresponding to advisability of output processing of calculation data is set to each particle, and the file output is performed for only the high-priority particle exceeding a base value.

As the concrete assignment (setting) of priority used in the sharp distinction of the "required data", the following is thought: a particle type (carrier or toner in case of an electrophotographic type; distribution of particle property (for example, distribution of particle diameter or distribution of particle charging amount); and an atomic type constituting a particle when the particle is seen at an atomic level (carbon atom C, oxygen atom O, nitride atom N, or hydrogen atom H). For example, the particles are divided into n-types of distribution sections and a priority is given to each distribution section, whereby data to be outputted is selected.

Since the target of the file output processing is determined on the basis of the priority assigned to the particle, decision for execution/inexecution of the file output becomes easy and the unnecessary information is not file-outputted, so that there are not the useless output documents and the file output is realized at a high speed. Since the file output of the unnecessary data is not executed, the file output time is reduced.

For example, in parallel calculation processing using many processors, a saturated tendency appears in parallel processing efficiency. As a countermeasure of its saturated tendency, firstly analysis is performed using a method of decomposition such as particle decomposition, force decomposition or spatial decomposition. Further, in the file output time of analysis result, a priority is assigned to a particle to be analyzed; in file output processing, a particle to be file-outputted is determined according to the priority, and the file output processing is performed for only the particle determined as a target of the file output.

For example, in case that the force decomposition method is applied, a calculation particle is assigned to a processor which performs parallel processing by means of a force matrix, whereby the efficient parallel processing in the plural processors is realized. Further, in the parallel processing by means of the force matrix, in the file output time of analysis results, priorities are assigned to particles, and the file output processing is performed for only the particles determined as targets of file output according to the priorities.

For example, as shown in FIGS. 5A and 5C, the calculation particles to which the priorities are set are assigned in the force matrix, whereby only the necessary calculation result file is extracted and outputted. In other words, assignment of priority to the output data is performed, and the particle data constituting the force matrix are arranged in response to its assignment.

FIGS. 5A and 5C show a processing example in case that 32 particles (n=32) is subjected to parallel calculation by means of 16 processors. The number m (m<n) of particles requiring the output file is taken as 16. 0 to 15 are set to high-priority particles which exceed a base value and require the output file, and 16 to 31 are set to low-priority particles which are below the base value and do not require the output file. The assignment between the particle and the node (processor) is similar to that in the first and second comparison examples, in which a particle #0 and a particle #1 are assigned to a node #0, a particle #2 and a particle #3 are assigned to a node #1, . . . , a particle #30 and a particle #31 are assigned to a node #15.

Since the particles #0 to #15 are high in priority, the nodes #0 to #7 assigned with these particles file-output the calculation result data. On the other, since the particles #16 to #31 are low in priority, the nodes #8 to #15 assigned with these particles do not file-output the calculation result data. Namely, the output of only the required calculation result data is performed.

Here, in case that the particle behavior analysis device 202 in the first constitutional example is applied, the output data are communicated in the row direction of the force matrix, and each representative node performs the file-output. Specifically, communication is performed among the parallel calculation elements in the same row in order to collect the file output data, the representative node (representative processor) in each row performs file output processing. A priority is given to each particle, only the processor assigned with the particle exceeding the priority base value communicates the output data in the row direction of the force matrix, and each representative node performs the file output.

Since the particles #0 to #15 are high in priority as shown in FIG. 5B, the node #0 collects the calculation result data of the nodes #0 to #3 in the same row and performs representatively the file output of their calculation results, and the node #4 collects the calculation result data of the nodes #4 to #7 in the same row and performs representatively the file output of their calculation results. On the other hand, since the particles #16 to #31 are low in priority, the nodes #8 to #15 assigned to their particles do not perform the collection of the calculation result data and the file output of their calculation results.

Hereby, compared with the case where one node (processor, CPU) receives transmission of the file output data from the other 15 calculation nodes, the communication with the three calculation nodes is performed per representative node. Therefore, the file output communication is performed only among the processors relating to the result data to be outputted, and the number of nodes which perform the output processing is also decreased. The collection of the calculation result data in the node #8 (S122_#8) and the file output processing (S124_#8) in FIG. 4D showing the second comparison example, and the collection of the calculation result data in the node #12 (S122_#12) and file output processing (S124_#12), which are not shown, are not required. In comparison with the second comparison example, since the number of nodes performing the output processing is decreased, the output processing time is correspondingly reduced. By using both the force matrix and the assignment of priority to the particle, the decision for execution/inexecution of file output becomes easy, so that the output target selection and the file output are realized at a high speed.

In case that the particle behavior analysis device 202 in the second constitutional example is applied, each node (processor) performs individually the file output processing, or data communication is performed with any one of nodes (processors) in order to collect the file output data, and its one node performs representatively the file output processing.

For example, as shown in FIG. 5D, since the particles #0 to #15 are high in priority, the node #0 receives the calculation result data from the nodes #1 to #7 which take respectively charge of the particles #2 to #15 except the particles #0 and #1 which the node #0 takes charge of, and file-outputs representatively the calculation results of their particles #0 to #15. On the other, since the particles #16 to #31 are low in priority, the nodes #8 to #15 assigned to their particles do not perform the collection of the calculation result data and the file output of the calculation results.

Hereby, even in case that one node (processor, CPU) receives transmission of the file output data from the other 15 calculation nodes, the number of nodes which become targets of the output processing (the number of particles on fact) is decreased, and the output processing time is reduced in response to its decrease. By using both the force matrix and the assignment of priority to the particle, the decision for execution/inexecution of the file output becomes easy, so that the output target selection and the file output are realized at a high speed.

A substance of which the priority should be set high is not limited to a main constituent of behavior. For example, in case that a behavior analysis result of a particle which does not become a main constituent of behavior but a supporting part is displayed, it is good that the priority of the particle which does not become the main constituent of the behavior is set high. Further, by using their particles together, the behavior analysis result of the particle which becomes the main constituent of the behavior and the behavior analysis result of the particle which does not become the main constituent of the behavior may be displayed separately.

The concrete case examples will be described below.

File Output Processing: First Exemplary Embodiment

Figure 6:
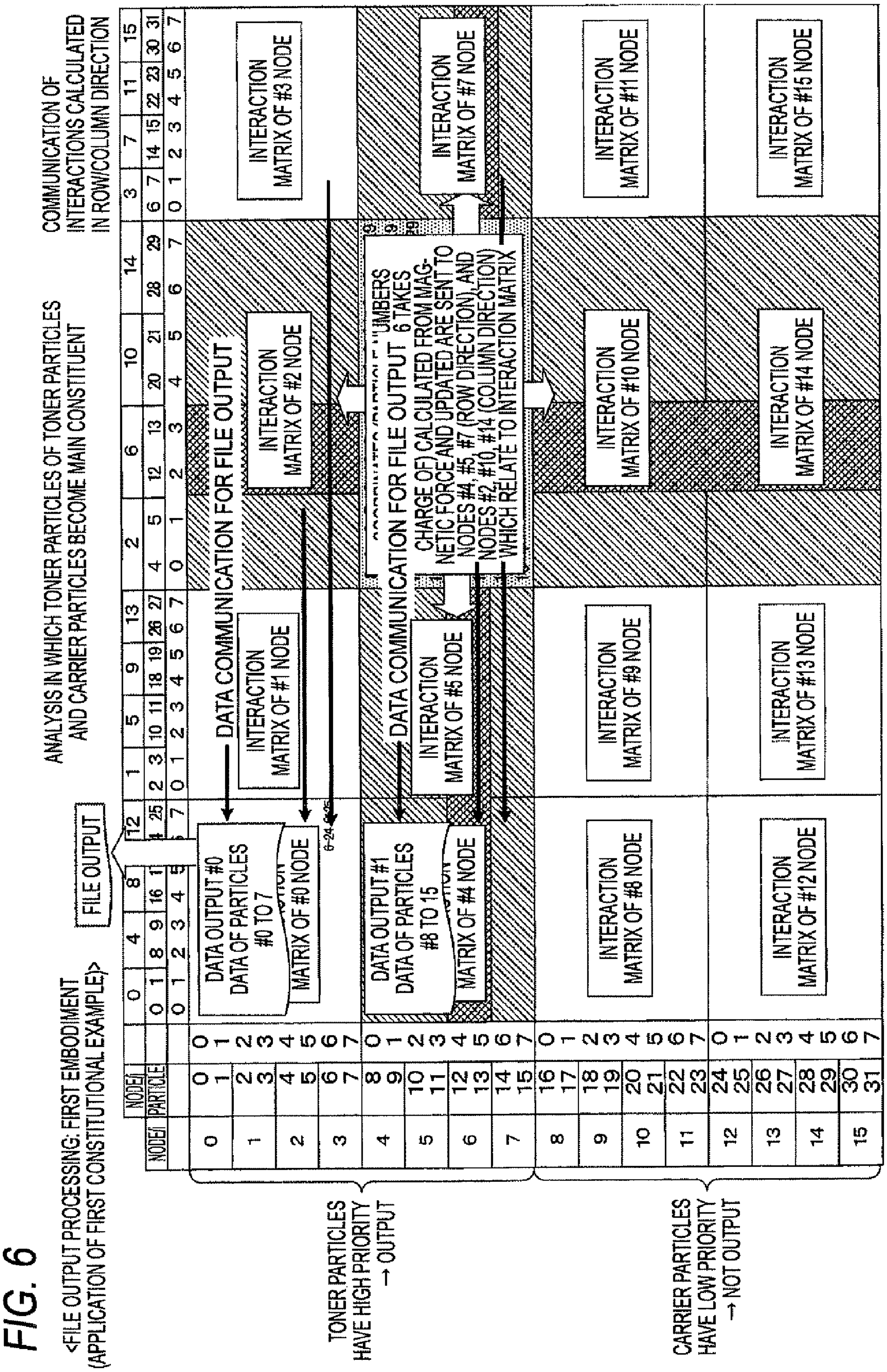
FIG. 6 is a diagram for explaining a first exemplary embodiment of file-output processing.

FIG. 6 is a diagram for explaining a first exemplary embodiment of file output processing.

The first exemplary embodiment is an example of a case where priory levels are set on the basis of particle types. In this case example, particularly, when data analysis work focusing attention on toner particles is performed, particles which are high in priority are taken as toner particles, and particles which are low in priority are taken as carrier particles, whereby only calculation data of the toner particles is file-outputted. For example, in analysis of development amount that is an example of powder simulation in a distinct element method (DEM), the first exemplary embodiment is an applied example to a case where the development amount of toner developed on the photoconductor 10 is calculated.

For example, in FIG. 5A to which the particle behavior analysis device 202 in the first constitutional example is applied, the priority setting section 242 assigns the toner particles to particles which are high in priority so that the toner particles become targets of file output processing, and assigns the carrier particles to particles which are low in priority so that the carrier particles do not become targets of file output processing. Namely, the priority setting section 242 gives a high priority to the toner particles and assigns the toner particles to a matrix portion which outputs a calculation result; and gives a low priority to the carrier particles and assigns the carrier particles to a matrix portion which does not output a calculation result.

Specifically, in FIG. 6 corresponding to FIG. 5A, the toner particles are denoted by small number in order to increase the priority; of a total of 32 particles, the toner particles requiring output-file are set to 0 to 15; and the carrier particles not requiring the output-file are set to 16 to 31. The toner particles are assigned to nodes #0-7 two by two, and the carrier particles are assigned to nodes #8-15 two by two. The high priorities are assigned to the toner particles, and only the calculation data of the toner particles are file-outputted.

In case that the particle behavior analysis device 202 in the first constitutional example is applied, since only the calculation data of the toner particles are file-outputted, the output data are communicated only in the node #0-7 in the row direction of the force matrix, whereby the calculation result data are collected, and representative nodes (the node #0 of the nodes #0-3, the node #4 of the nodes #4-7) perform the file output sequentially. Hereby, the amount of the outputted data is half, so that the processing time for the file-output is reduced.

Though illustration is omitted, in case that the particle behavior analysis device 202 in the second constitutional example is applied, in FIG. 5C, the toner particles are assigned to high-priority particles (#0-15) having and the carrier particles are assigned to low-priority particles (#16-31). The file output is individually performed by each node, or collectively performed by any one of nodes.

File Output Processing: Second Exemplary Embodiment

FIG. 7 is a diagram for explaining a second exemplary embodiment of file output processing.

The second exemplary embodiment is an example of a case where priory levels are set on the basis of particle types. In this case example, particularly, when data analysis work focusing attention on carrier particles is performed, particles which are high in priority are taken as carrier particles, and particles which are low in priority are taken as toner particles, whereby only calculation data of the carrier particles is file-outputted. For example, in analysis of development amount that is an example of powder simulation in a distinct element method (DEM), the second exemplary embodiment is an applied example to a case where attention is focused on the behavior of the carrier particles like analysis focusing attention on a pick-up area or a pick-off area of developer.

For example, in FIG. 5A to which the particle behavior analysis device 202 in the first constitutional example is applied, the priority setting section 242 assigns the carrier particles to particles which are high in priority so that the carrier particles become targets of file output processing, and assigns the toner particles to particles which are low in priority so that the toner particles do not become targets of file output processing. Namely, the priority setting section 242 gives a high priority to the carrier particles and assigns the carrier particles to a matrix portion which outputs a calculation result; and gives a low priority to the toner particles and assigns the toner particles to a matrix portion which does not output a calculation result.

Specifically, in FIG. 7 corresponding to FIG. 5A, the carrier particles are denoted by small number in order to increase the priority; of a total of 32 particles, the carrier particles requiring the output-file are set to 0 to 15, and the toner particles not requiring the output-file are set to 16 to 31. The carrier particles are assigned to nodes #0-7 two by two, and the toner particles are assigned to nodes #8-15 two by two. The high priorities are assigned to the carrier particles, and only the calculation data of the carrier particles are file-outputted.

In case that the particle behavior analysis device 202 in the first constitutional example is applied, since only the calculation data of the carrier particles are file-outputted, the output data are communicated only in the node #0-7 in the row direction of the force matrix, whereby the calculation result data are collected, and representative nodes (the node #0 of the nodes #0-3, and the node #4 of the nodes #4-7) perform the file output sequentially. Hereby, the amount of the outputted data is half, so that the processing time for the file-output is reduced.

In case that pick-up/pick-off in a mixed type of carrier particles and toner particles is analyzed, only the calculation results of the carrier particles contributing to a flow are file-outputted. File input/output processing of the toner particles which are larger in number than the carrier particles is not performed, whereby greater reduction of the file output processing time than the reduction in a case where this exemplary embodiment is not applied can be expected.

Although illustration is omitted, in case that the particle behavior analysis device 202 in the second constitutional example is applied, in FIG. 5C, the carrier particles are assigned to the particles (#0-#15) which are high in priority, and the toner particles are assigned to the particles (#16-#31) which are low in priority. The file outputs are individually performed by the respective nodes, or collectively formed by any one of the nodes.

File Output Processing: Third Exemplary Embodiment

Figure 8A:
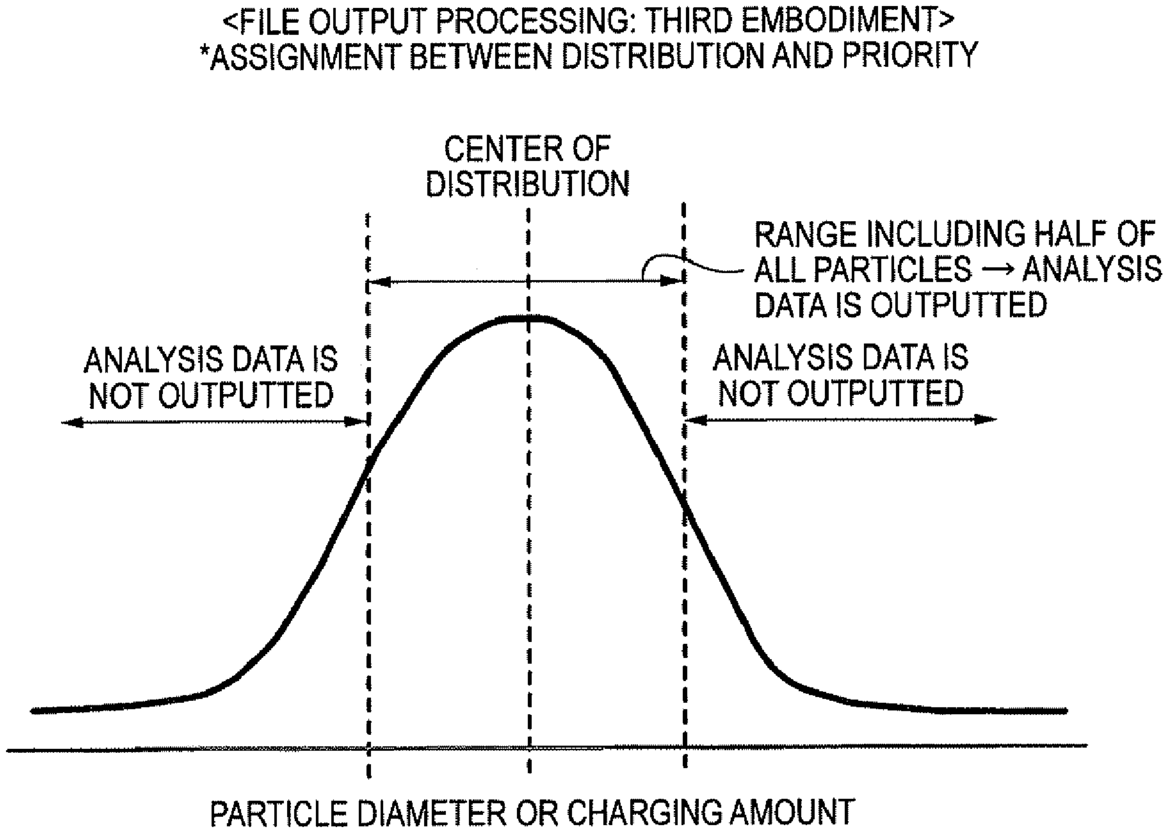
FIG. 8A is a diagram for explaining an assignment method of priority in a third exemplary embodiment of file-output processing.
Figure 8B:
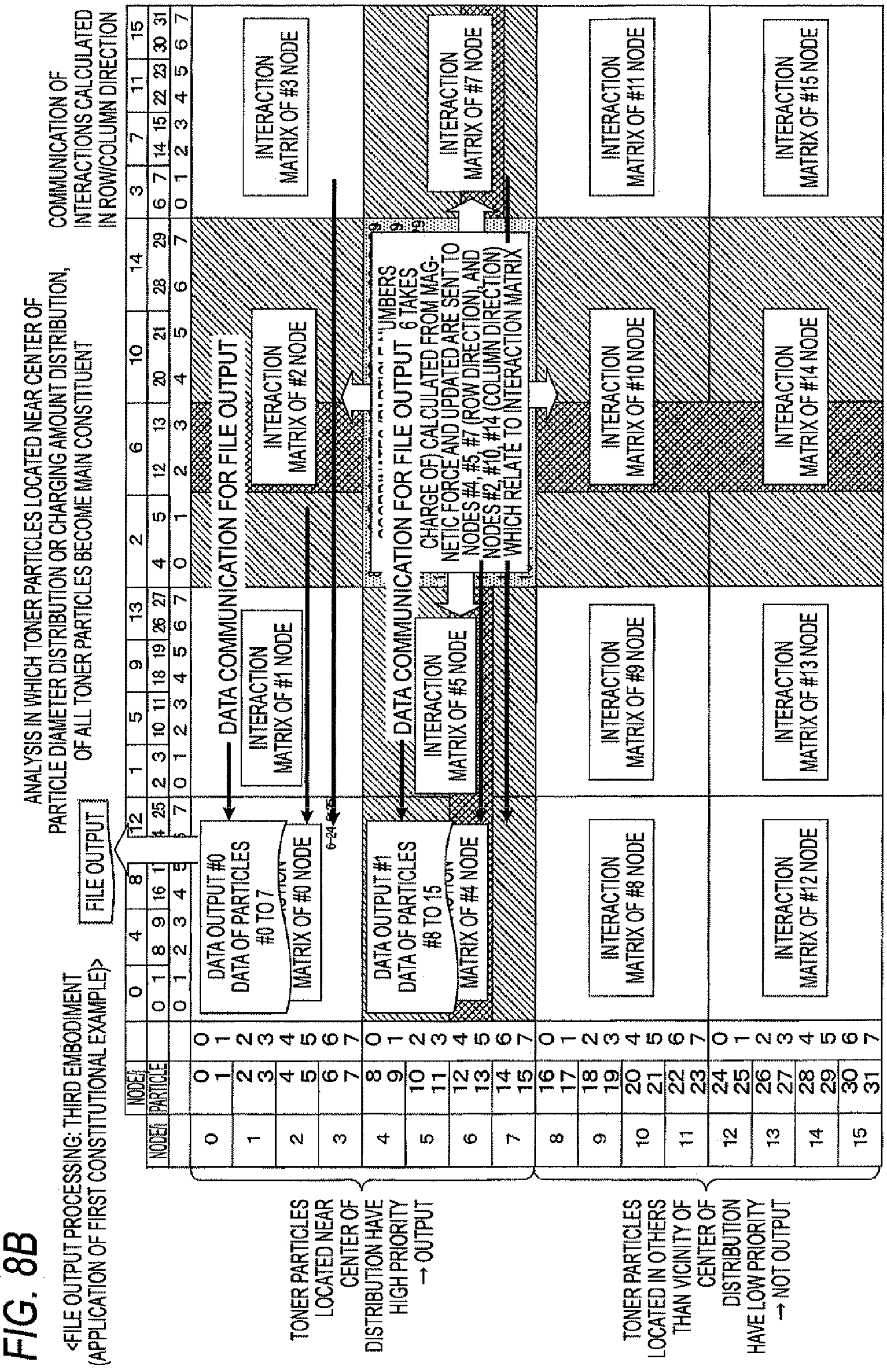
FIG. 8B is a diagram for explaining the third exemplary embodiment of file output processing.

FIGS. 8A and 8B are diagrams for explaining a third exemplary embodiment of file output processing. Here, FIG. 8A is a diagram for explaining an assignment method of priority in the third exemplary embodiment of file output processing. FIG. 8B is a diagram for explaining the third exemplary embodiment of file output processing.

The third exemplary embodiment is a case example in case that attention is focused on properties of particle and a priority is set on the basis of its property distribution. In this case example, to a distribution section including many particles which become main constituents of behavior, a high priority is given; and to a distribution part including few particles which become main constituents of behavior, a low priority is given, whereby only calculation data of the distribution section including many particles which become main constituents of behavior is file-outputted. Particularly, as a different point from the later-described fifth exemplary embodiment (particularly in a second example), in case that a ratio of an attention particle to all particles is clearly distinguished on relation with the representative node, this example is effective. Further, as a different point from the later-described fifth exemplary embodiment (particularly in a third example), in case that a distribution has approximately the shape of normal distribution, this example is effective.

As properties, for example, in case of the electrophotographic type image forming apparatus 1, a particle diameter of toner particle, charging amount, and the like are thought. For example, in the analysis of development amount that is an example of powder simulation in a distinct element method (DEM), the third exemplary embodiment is an applied example to a case where attention is focused on a toner particle which becomes a main constituent of behavior, of toner particles like analysis focusing attention on a toner particle having a particle diameter or the charging amount in a fixed range including a specified portion (center of distribution: portion near a center value).

For example, in FIG. 5A to which the particle behavior analysis device 202 in the first constitutional example is applied, the priority setting section 242, as shown in FIG. 8A showing a distribution characteristic focusing attention on a particle diameter and charging amount, in case that its distribution profile approximates to normal distribution, assigns the toner particle property near a center in which the distribution quantity is large to a particle which is high in priority so that its toner particle property becomes a target of file output processing; and assigns the toner particle property in which the distribution quantity is small to a particle which is low in priority so that its toner particle property does not become a target of file output processing.

Namely, the priority setting section 242 gives a high priority to a toner particle having a large amount of distribution, and assigns its toner particle to a matrix portion which outputs a calculation result; and gives a low priority to a toner particle having a small amount of distribution, and assigns its toner particle to a matrix portion which does not output a calculation result. For example, a range including a half of all particles is set to the high priority so as to become a target of file output, and portions other than its range are set to the low priority so as not to become the target of file output.

Specifically, in FIG. 8B corresponding to FIG. 5A, the toner particles having the specified particle diameter or charging amount (approximating to the central value) are denoted by small number in order to increase the priority; of a total of 32 toner particles, the specified toner particles requiring the output-file (half of all the toner particles such as the toner particles near the center value) are set to 0 to 15, and the toner particles having the small particle diameter or the large particle diameter, or the small charging amount or the large charging amount which do not require the output-file are set to 16 to 31. The toner particles are assigned to nodes #0-15 two by two. In distribution of particle diameter or charging amount, the toner particles in the specified distribution area (near the center value) are assigned to the high priorities, and only the calculation data of the particles in its specified distribution area are file-outputted.

In case that the particle behavior analysis device 202 in the first constitutional example is applied, in the particle diameter distribution or the charging amount distribution, only the calculation data of a half of all the toner particles having the particle diameter or the charging amount near an average value are file-outputted. Therefore, only in the node #0 to 7, in the row direction of the force matrix, the output data are communicated, thereby to collect the calculation result data, and the representative nodes (the node #0 of the nodes #0-3, and the node #4 of the nodes #4-7) perform the file-output sequentially. Hereby, the amount of the outputted data is half, so that the processing time for the file-output is reduced.

Although illustration is omitted, in case that the particle behavior analysis device 202 in the second constitutional example is applied, in FIG. 5C, the particles in which the distribution quantity is large are assigned to particles (#015) which are high in priority, and the particles in which the distribution quantity is small are assigned to particles (#16-#31) which are low in priority. The file-outputs are individually performed by the respective nodes, or collectively performed by any one of the nodes.

In the foresaid example, although the particles near the center in which the distribution quantity is large are set to the high priority, to the contrary, the particles in the portion in which the distribution quantity is small may be set to the high priority thereby to perform the file-output of the analysis result focusing attention on its portion. For example, this is a case where an analysis result of behavior of particles which do not become main constituents of behavior but become supporting parts is displayed. Further, by performing the file output relating to the vicinity of the center in which the distribution quantity is large and the file output relating to the portion in which the distribution quantity is small, the analysis result of the behavior of the particles which become the main constituents of behavior and the analysis result of the behavior of the particles which do not become the main constituents of behavior may be displayed separately.

File Output Processing: Fourth Exemplary Embodiment

Figure 9A:
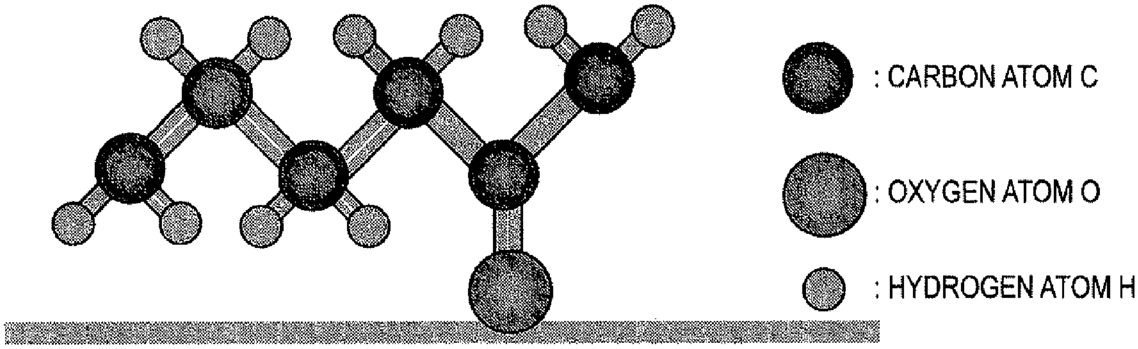
FIG. 9A is a diagram for explaining an assignment method of priority in a fourth exemplary embodiment of file output processing.
Figure 9B:
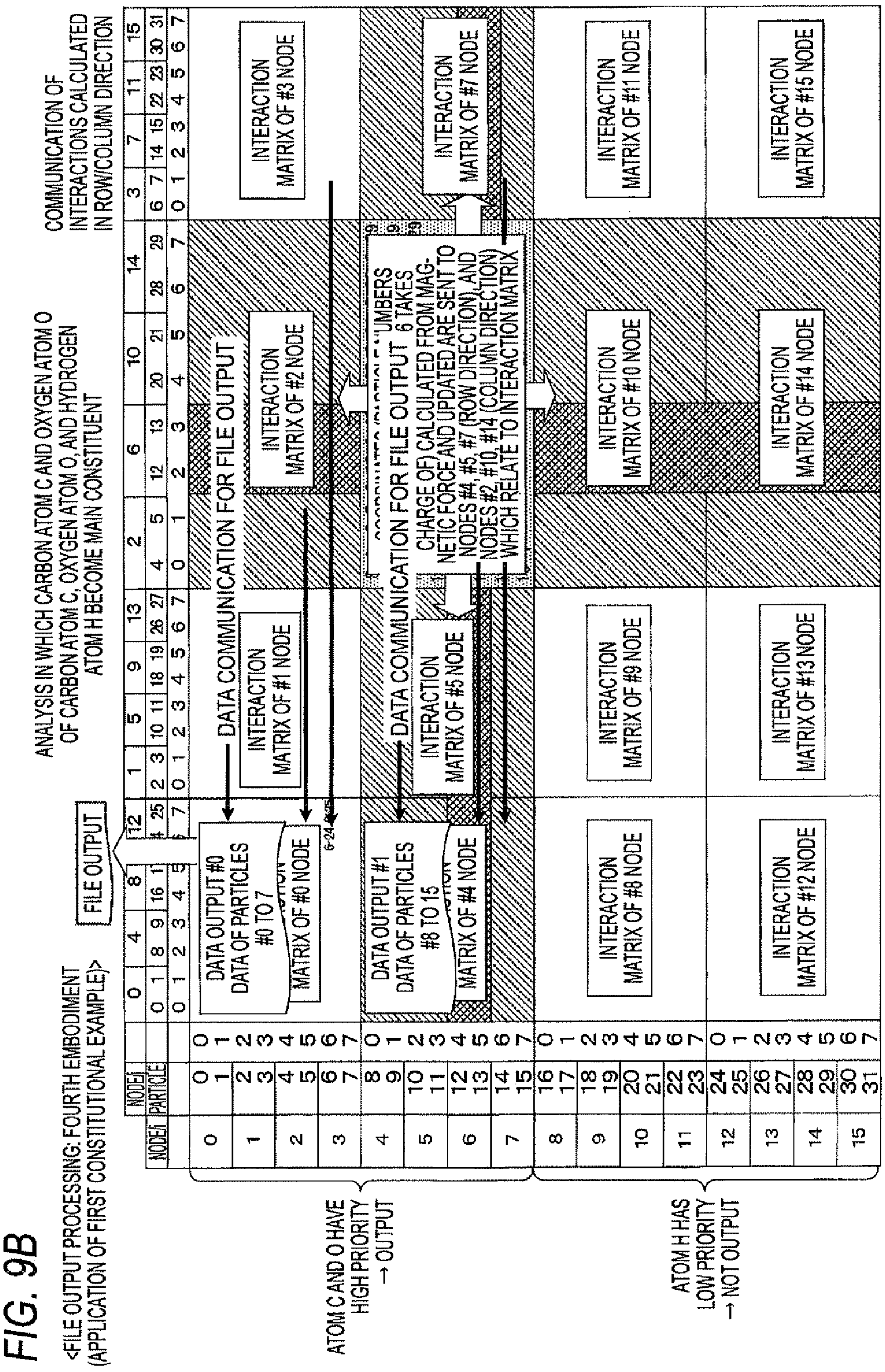
FIG. 9B is a diagram for explaining the fourth exemplary embodiment of file output processing

FIGS. 9A and 9B are diagrams for explaining a fourth exemplary embodiment of file output processing. Here, FIG. 9A is a diagram for explaining an assignment method of priority in the fourth exemplary embodiment of file output processing. FIG. 9B is a diagram for explaining the fourth exemplary embodiment of file output processing.

The fourth exemplary embodiment is an applied example to particle behavior analysis in an electrophotographic type or others, and particularly an applied example to behavior analysis on a molecular level. In this case, on the basis of an atomic type constituting a molecule of a particle, a priority is set. This exemplary embodiment is a case example in case that: to an atomic type which becomes a main constituent of behavior, a high priority is set; and to the other atomic types, a low priority is set. For example, this exemplary embodiment is an applied example to behavior analysis of organic compound that is an example of molecular dynamics simulation in a molecular dynamics (MD) method.

For example, in case of an organic compound including a carbon atom and an oxygen atom, the priority of the carbon atom is set higher than that of the oxygen atom, whereby an analysis result of the oxygen atom is not file-outputted. Further, in case of an organic compound including a nitrogen atom and a hydrogen atom, the priority of the nitrogen atom is set higher than that of the hydrogen atom, whereby an analysis result of the hydrogen atom is not file-outputted. In case of an organic compound including a carbon atom, an oxygen atom, a nitrogen atom, and a hydrogen atom, the priorities are determined from the aforesaid combination. For example, since a main target in a molecular behavior analysis result is the carbon atom, an analysis result of the hydrogen atom is not file-outputted.

For example, as shown in FIG. 9A, material property of high molecule is determined by behavior of the carbon atom and the oxygen atom, the behavior of the carbon atom appears most strongly, and the contribution by the hydrogen atom is small. In this case, the priorities (carbon atom>oxygen atom>hydrogen atom) are assigned to the atomic types, and whether each calculation result is outputted or not is determined. As an example, the analysis results of the carbon atom and the oxygen atom are file-outputted but the analysis result of the hydrogen atom is not file-outputted.

For example, it is assumed that of a total of 32 atoms, the sum of the carbon atoms and the oxygen atoms is 16 which is half of 32, and the other 16 atoms are hydrogen atoms. In this case, specifically, in FIG. 9B corresponding to FIG. 5A, the carbon atoms and the oxygen atoms are denoted by small number in order to increase the priority; of a total of 32 atoms, the carbon atoms and oxygen atoms requiring the output-file are set to 0 to 15; and the hydrogen atoms not requiring the output-file are set to 16 to 31. The carbon atoms and the oxygen atoms are assigned to nodes #0-7 two by two, and the hydrogen atoms are assigned to nodes #8-15 two by two. The high priorities are assigned to the carbon atoms and oxygen atoms, and only the calculation data of the carbon atoms and oxygen atoms are file-outputted.

In case that the particle behavior analysis device 202 in the first constitutional example is applied, since only the calculation data of the carbon atoms and the oxygen atoms are file-outputted, only in the node #0 to 7, in the row direction of the force matrix, the output data are communicated, thereby to collect the calculation result data, and the representative nodes (the node #0 of the nodes #0-3, and the node #4 of the nodes #4-7) perform the file-output sequentially. Hereby, the amount of the outputted data is half of the data amount of all the atoms, so that the processing time for the file-output is reduced.

Since the number of the hydrogen atoms is generally large, the file output processing of the analysis results on the hydrogen atoms is not performed in the molecular dynamics simulation of the high-molecular material, whereby greater reduction of the file output processing time is expected than the reduction in case that this exemplary embodiment is not applied.

Although illustration is omitted, in case that the particle behavior analysis device 202 in the second constitutional example is applied, in FIG. 5C, the atomic type which becomes a main constituent of behavior is assigned to the high-priority atoms (#0 to #15), and other atomic types than the atomic type which becomes a main constituent of behavior are assigned to the low-priority atoms (#16 to #31).

File Output Processing: Fifth Exemplary Embodiment

Figure 10A:
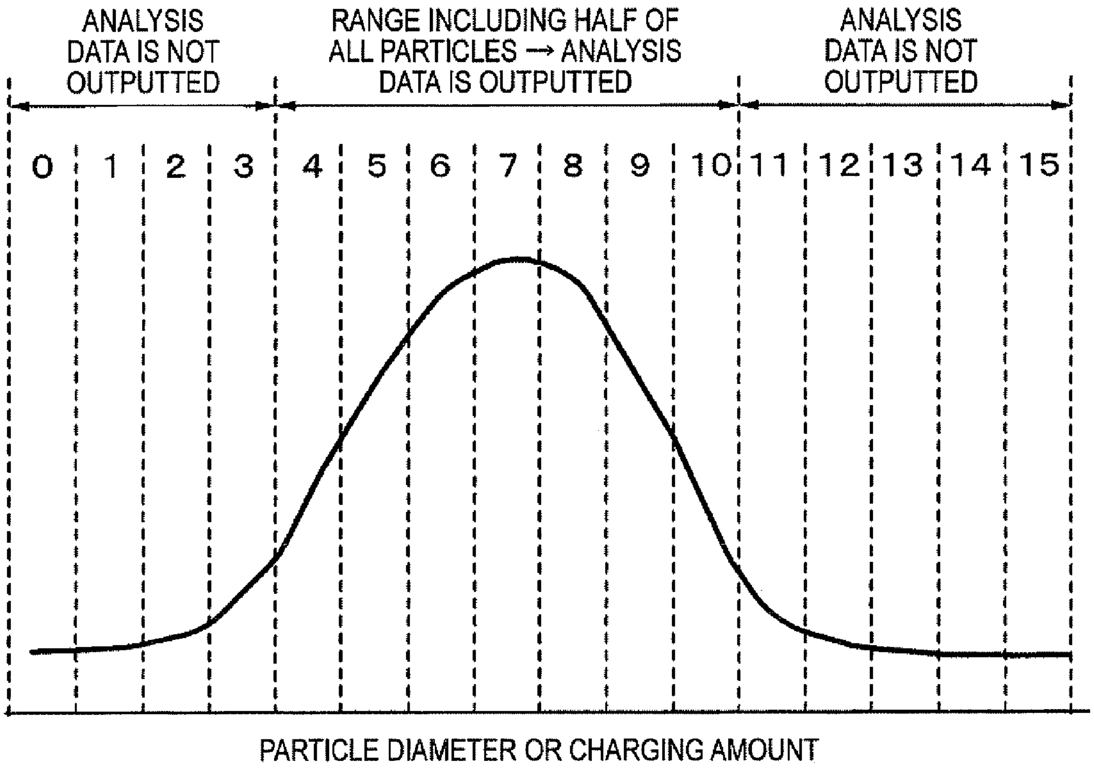
FIG. 10A is a diagram for explaining an assignment method of priority in a fifth exemplary embodiment (first example) of file output processing.
Figure 10B:
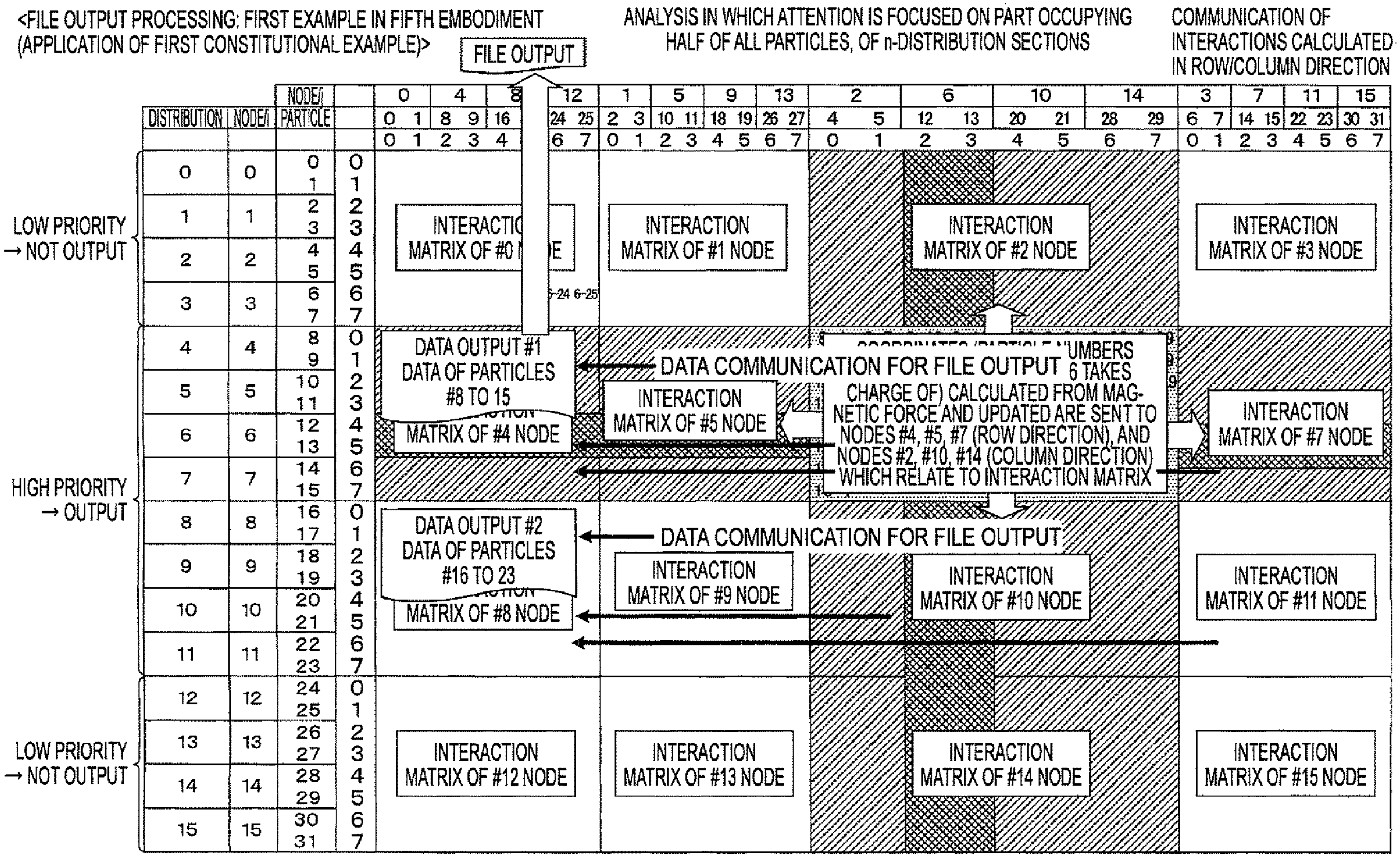
FIG. 10B is a diagram for explaining the fifth exemplary embodiment (first example) of file output processing.
Figure 10C:
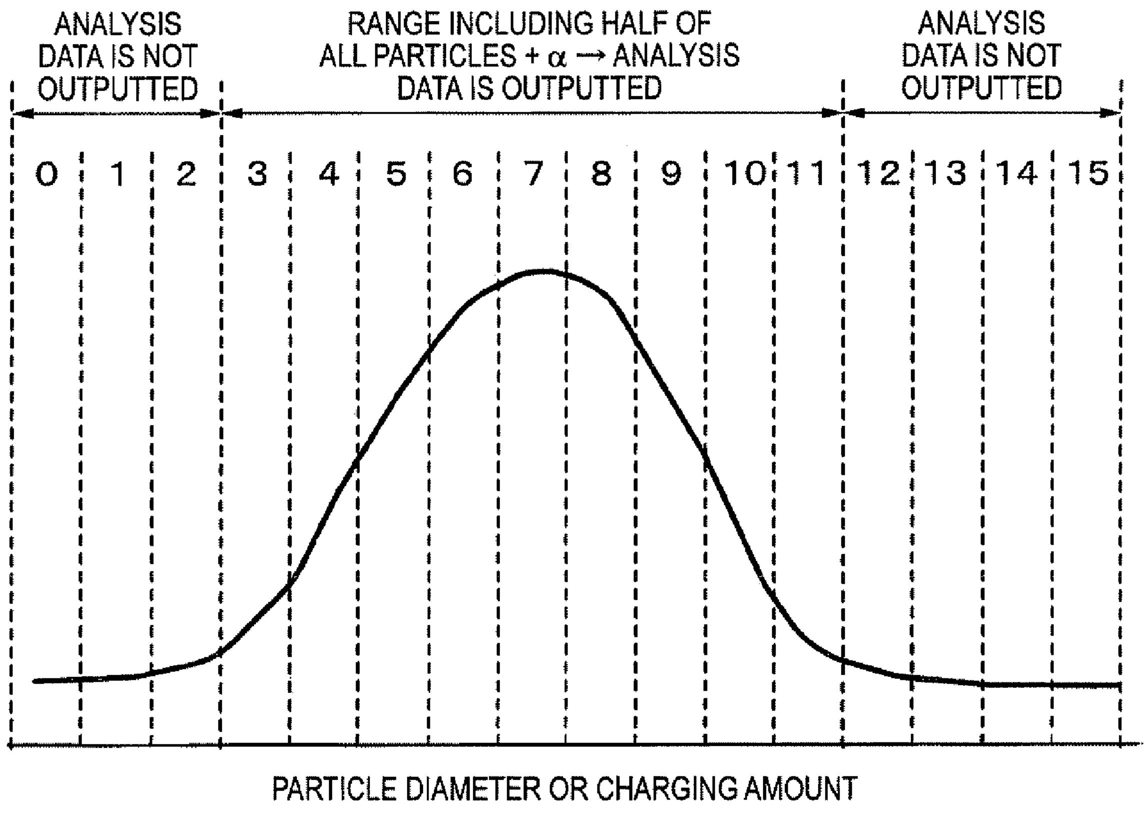
FIG. 10C is a diagram for explaining an assignment method of priority in the fifth exemplary embodiment (second example) of file output processing.
Figure 10D:
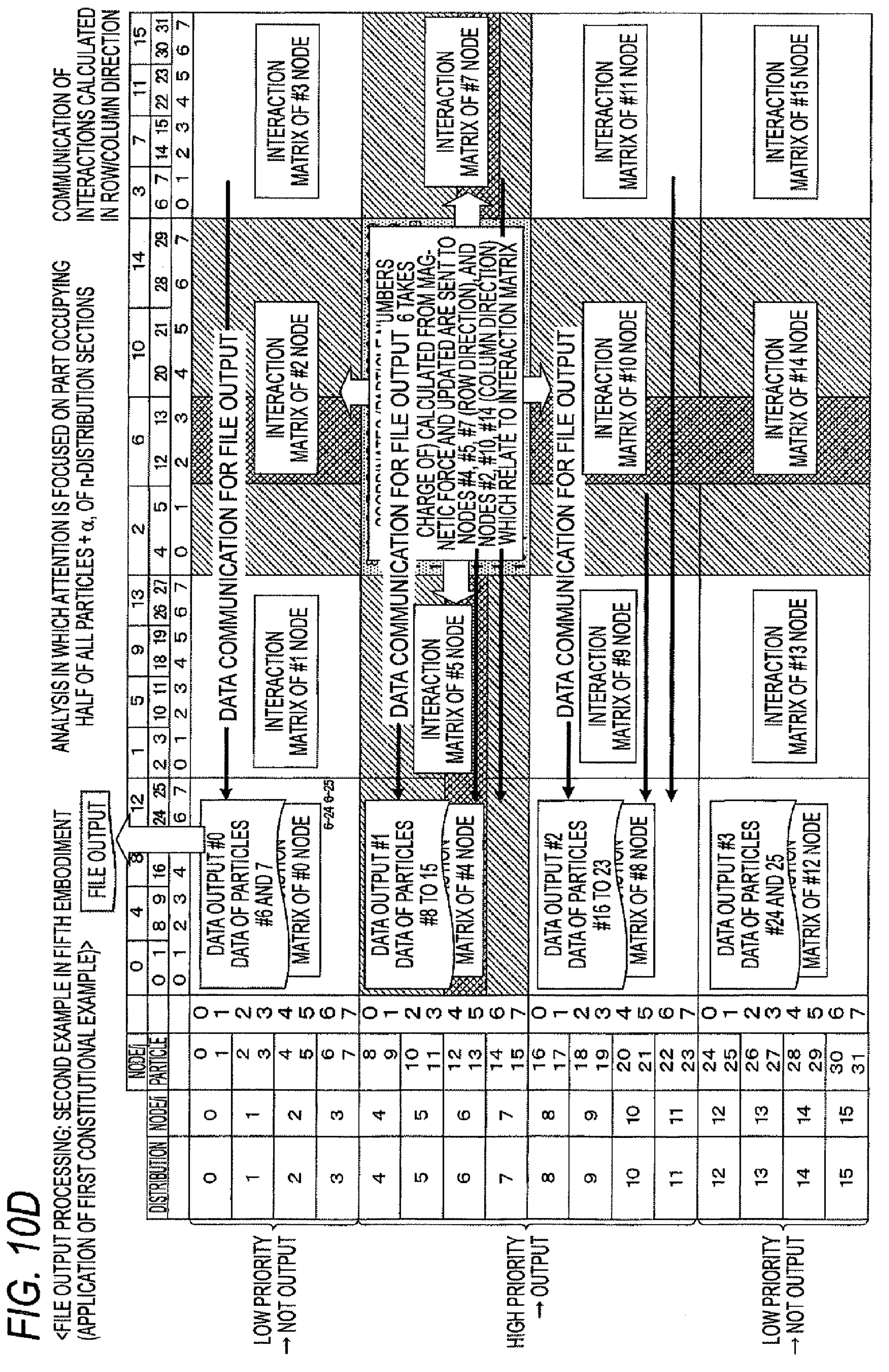
FIG. 10D is a diagram for explaining the fifth exemplary embodiment (second example) of file output processing.
Figure 10E:
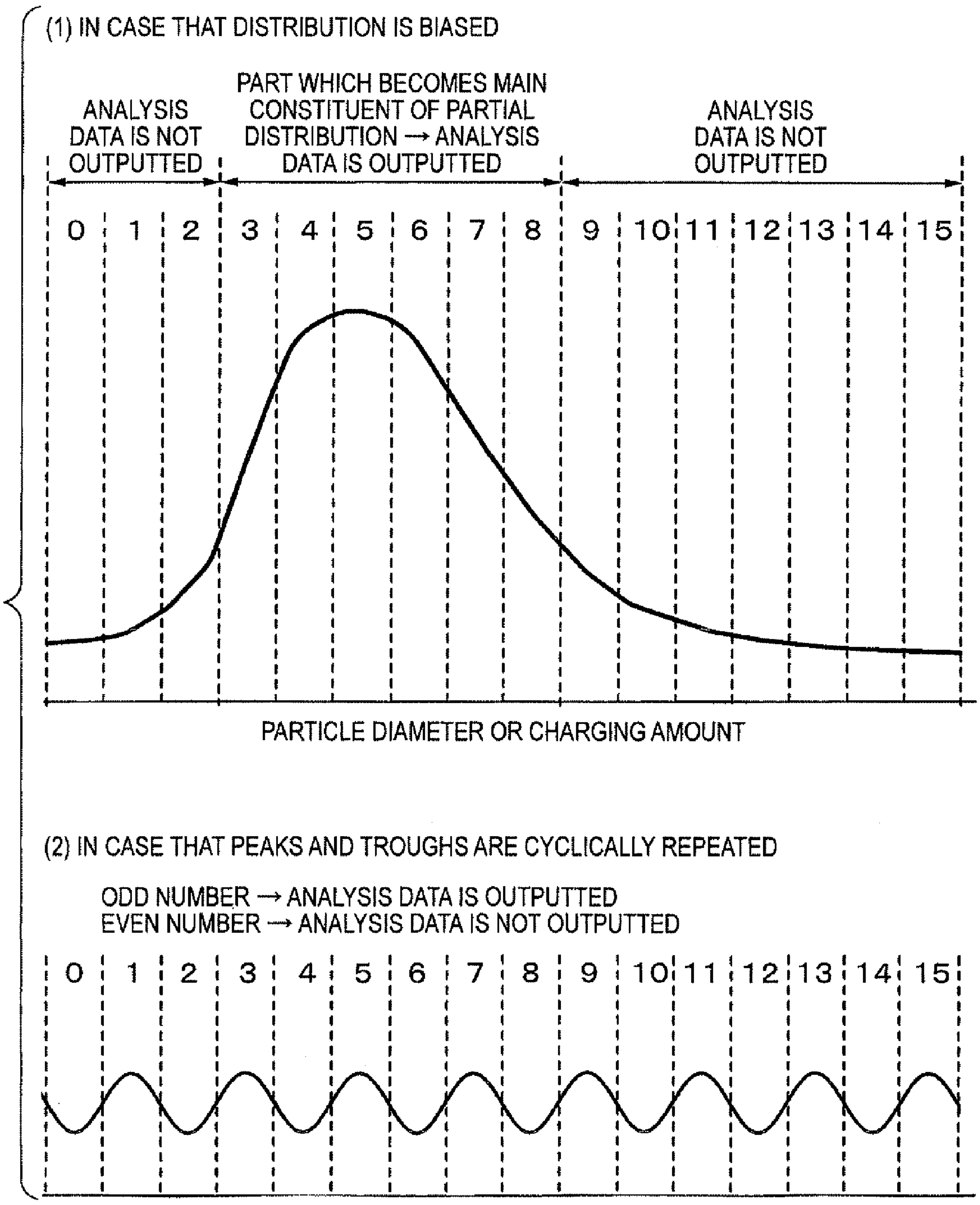
FIG. 10E is a diagram for explaining an assignment method of priority in the fifth exemplary embodiment (third example) of file output processing.
Figure 10F:
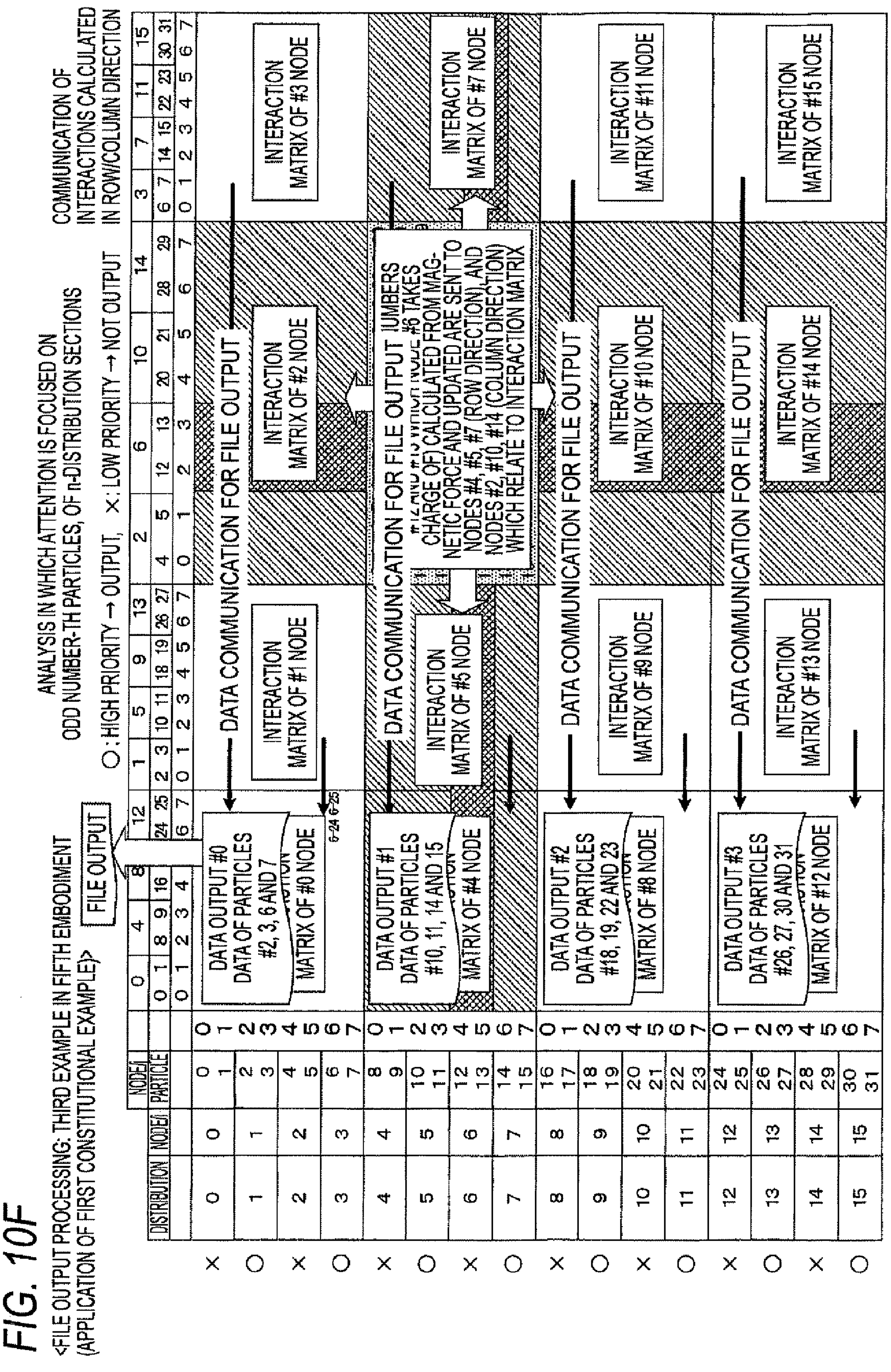
FIG. 10F is a diagram for explaining the fifth exemplary embodiment (third example) of file output processing.

FIGS. 10A and 10B are diagrams for explaining a fifth exemplary embodiment of file output processing. Here, FIG. 10A is a diagram for explaining an assignment method of priority in the fifth exemplary embodiment (first example) of file output processing. FIG. 10B is a diagram for explaining the fifth exemplary embodiment (first example) of file output processing. FIG. 10C is a diagram for explaining an assignment method of priority in the fifth exemplary embodiment (second example) of file output processing. FIG. 10D is a diagram for explaining the fifth exemplary embodiment (second example) of file output processing. FIG. 10E is a diagram for explaining an assignment method of priority in the fifth exemplary embodiment (third example) of file output processing. FIG. 10F is a diagram for explaining the fifth exemplary embodiment (third example) of file output processing.

The fifth exemplary embodiment is provided by generalizing the first to fourth exemplary embodiments. Herein, particles are divided into n-distribution sections, the n-distribution sections are assigned to n-processors (numeric processing sections 234) constituting the force matrix, and priorities are set to the n-distribution sections. The number of distribution sections and the number of the numeric processing sections 234 are matched in relation of one-on-one, and the priority is set to each distribution section. At this time, for example, a high priority is set to a distribution section which becomes a main constituent of behavior, and low priorities are set to the other distribution sections. Although the fifth exemplary embodiment resembles the third exemplary embodiment, the fifth exemplary embodiment is an applied example in which the distribution is divided into sections more finely according to the distribution profile, and the priorities are individually set to their distribution sections.

Regarding a way of thinking on the distribution itself, similarly to in the third exemplary embodiment, attention is focused on the properties of particles, and the priority is set on the basis of the property distribution of the particles. As properties, for example, in case of the electrophotographic type image forming apparatus 1, it is thought that a particle diameter of toner particle or the charging amount.

Particles are divided into n-distribution sections, and the n-distribution sections are assigned to processors constituting the force matrix. Specifically, the particle distribution is divided into distribution numbers 0, 1, . . . , n−2, and n−1, and the high priority is set to the distribution section which file-outputs the analysis result data. The distribution numbers 0, 1, . . . , n−2, and n−1 correspond to processors #0, #1, . . . , #(n−2), and #(n−1), respectively. Only the processor assigned to the distribution section to which the high priority is given so as to exceed the base value performs file output processing.

For example, the assignment method of priority in the fifth exemplary embodiment (first example) shown in FIG. 10A resembles that in the third exemplary embodiment shown in FIG. 8. The difference between their exemplary embodiments is that: in the third exemplary embodiment, the particles are roughly divided into the center vicinity of the distribution and the others; and in the fifth exemplary embodiment, the particles are divided into the n-distribution sections. The assignment method in the fifth exemplary embodiment (first example), similarly to that in the third exemplary embodiment, is effective in case that a ratio of an attention particle to all particles is clearly distinguished on relation with the representative node.

The fifth exemplary embodiment (first example) is different from the fifth exemplary embodiment (second example and third example) described later in that a part which the representative node in the row direction takes charge of collective file-output on is assigned to the priority level in relation of one-on-one. For example, in FIG. 5A in which the particle behavior analysis device 202 in the first constitutional example is applied, the priority setting section 242 assigns a distribution section that becomes a main constituent of behavior to the representative node which takes charge of the high-priority particle, and assigns other distribution sections than the distribution section that becomes the main constituent of behavior to the representative nodes which take charge of the low-priority particles.

For example, assuming that n=16, in FIG. 10A, distribution numbers 4 to 11 are distribution sections to which the high priorities are given. In FIG. 10B, regarding nodes #4 to #11 assigned to their distribution sections, the representative nodes perform the file-output. Specifically, the node #4 collects calculation result data of the nodes #4 to #7 in the same row, and performs the file-output of their calculation results representatively. The node #8 collects calculation result data of the nodes #8 to #11 in the same row, and performs the file-output of their calculation results representatively. On the other hand, distribution numbers 0-3 and 12-15 are distribution sections to which the low priorities are given. In FIG. 10B, regarding the nodes #0 to #3 and #12 to #15 assigned to their distribution sections, the file output of the calculation results is not performed. Compared with the third exemplary embodiment, though the node which takes charge of the file output is different, the similar processing to that in the third exemplary embodiment is substantially performed.

Although illustration is omitted, in case that the particle behavior analysis device 202 in the second constitutional example is applied, there cannot be a concept that a part which the representative node in the row direction takes charge of collective file-output on is assigned to the priority level in relation of one-on-one. Therefore, in FIG. 5C, a distribution section that becomes a main constituent of behavior is assigned to the node which takes charge of the high-priority particle, and other distribution sections than the distribution section that becomes the main constituent of behavior are assigned to the nodes which take charge of the low-priority particles. The file output is performed individually by each node, or performed collectively by any one of nodes.

Further, an assignment method of priority in the fifth exemplary embodiment (second example) shown in FIG. 10C resembles that in the fifth exemplary embodiment (first example) shown in FIG. 10A. The difference between their examples is that: the assignment method in the second example is applied in case that a ratio of an attention particle to all particles is not clearly distinguished on relation with the representative node. Although the part which the representative node in the row direction takes charge of collective file-output on is assigned to the priority level in relation of one-on-one in the fifth exemplary embodiment (first example), the fifth exemplary embodiment (second example) is a case example in which a portion where the part which the representative node in the row direction takes charge of collective file-output on is assigned to the priority level in relation of one-on-one, and a portion where the part which the representative node in the row direction takes charge of collective file-output on is not assigned to the priority level in relation of one-on-one are mixed.

For example, in FIG. 5A to which the particle behavior analysis device 202 in the first constitutional example is applied, the priority setting section 242, regarding the portion where the part which the representative node in the row direction takes charge of collective file-output on is assigned to the priority level in relation of one-on-one, assigns the distribution section which becomes a main constituent of behavior to a representative node which takes charge of the high-priority particle, and assigns the other distribution sections than the distribution section which becomes the main constituent of behavior to representative nodes which take charge of the low-priority particles. Regarding the portion where the part which the representative node in the row direction takes charge of collective file-output on is not assigned to the priority level in relation of one-on-one, the priority setting section 242 assigns the distribution section which becomes a main constituent of behavior to a node which takes charge of the high-priority particle, and assigns the other distribution sections than the distribution section which becomes the main constituent of behavior to nodes which take charge of the low-priority particles.

For example, assuming that the number n of all particles is 16 (n=16), in FIG. 10C, distribution numbers 3 to 12 are distribution sections to which the high priorities are given. In FIG. 10D, regarding nodes #3 to #12 assigned to their distribution sections, the representative nodes perform the file output. Specifically, the node #4 collects calculation result data of the nodes #4 to #7 in the same row, and performs the file-output of their calculation results representatively. The node #8 collects calculation result data of the nodes #8 to #11 in the same row, and performs the file-output of their calculation results representatively.

Further, in FIG. 10C, distribution numbers 0 to 2 and 13 to 15 are distribution sections to which the low priorities are given. In FIG. 10D, regarding nodes #0 to #2 and #13 to #15 assigned to their distribution sections, the file output of the calculation results is not performed. Here, the representative node #0 which is representative of the nodes #0 to #3 receives a calculation result file of the node #3 assigned to the distribution number 3, and representatively performs the file output of its calculation result. The representative node #12 which is representative of the nodes #12 to #15 performs the file output of a self-calculation result (nodes #12) assigned to the distribution number 12.

Although illustration is omitted, in case that the particle behavior analysis device 202 in the second constitutional example is applied, there cannot be a concept that a part which the representative node in the row direction takes charge of collective file output on is assigned to the priority level in relation of one-on-one. Therefore, in FIG. 5C, a distribution section that becomes a main constituent of behavior is assigned to the node which takes charge of the high-priority particle, and other distribution sections than the distribution section that becomes the main constituent of behavior are assigned to the nodes which take charge of the low-priority particles. The file output is performed individually by each node, or performed collectively by any one of nodes.

Further, an assignment method of priority in the fifth exemplary embodiment (third example) shown in FIG. 10E is the same as "the portion where the part which the representative node in the row direction takes charge of collective file-output on is not assigned to the priority level in relation of one-on-one" in the fifth exemplary embodiment (second example). As difference from the third exemplary embodiment and the fifth exemplary embodiment (first example and second example), the assignment method in the fifth exemplary embodiment (third example) is effective in case that a distribution profile does not approximate to normal distribution, for example, in case that a center of distribution is out of a center of the entire range and off to an end (FIG. 10E(1)), or in case that the distribution has a profile in which peaks and troughs are cyclically repeated (FIG. 10E(2)). Also in this case, according to the distribution profile, the distribution section by occupied by the attention particles is set to high priority. Namely, in FIG. 5A to which the particle behavior analysis device 202 in the first constitutional example is applied, the priority setting section 242 assigns the distribution section which becomes a main constituent of behavior to a node which takes charge of the high-priority particle, and assigns the other distribution sections than the distribution section which becomes the main constituent of behavior to nodes which take charge of the low-priority particles.

For example, assuming that n=16, the assignment method in the fifth exemplary embodiment (third example) will be concretely described with reference to FIG. 10E(2) in which the distribution has the profile in which peaks and troughs are cyclically repeated. In FIG. 10E(2), odd distribution numbers are distribution sections to which high priority is given, and even distribution numbers are distribution sections to which low priority is given. For example, when a particle A is a high-priority particle and a particle B is a low-priority particle, the particle A corresponds to the odd distribution number, and the particle B corresponds to the even distribution number. Further, to the contrary, when the particle B is a high-priority particle and the particle A is a low-priority particle, the particle B corresponds to the odd distribution number, and the particle A corresponds to the even distribution number.

In FIG. 10F, regarding the odd numbers-th nodes #1, #3, . . . , #15 assigned to the odd distribution numbers having the high priority, representative nodes perform file output. The even distribution numbers are distribution sections to which the low priority is given, and the even numbers-th nodes #0, #2, . . . , #14 in FIG. 10F assigned to their distribution sections do not perform the file output of the calculation results.

Here, the representative node #0 which is representative of the nodes #0 to #3 receives the calculation result files of the nodes #1 and #3 assigned to the odd distribution numbers 1 and 3 having the high priority, and performs representatively the file output of their calculation results. The representative node #4 which is representative of the nodes #4 to #7 receives the calculation result files of the nodes #5 and #7 assigned to the odd distribution numbers 5 and 7 having the high priority, and performs representatively the file output of their calculation results. The representative node #8 which is representative of the nodes #8 to #11 receives the calculation result files of the nodes #9 and #11 assigned to the odd distribution numbers 9 and 11 having the high priority, and performs representatively the file output of their calculation results. The representative node #12 which is representative of the nodes #12 to #15 receives the calculation result files of the nodes #13 and #15 assigned to the odd distribution numbers 13 and 15 having the high priority, and performs representatively the file output of their calculation results.

Although illustration is omitted, in case that the particle behavior analysis device 202 in the second constitutional example is applied, there cannot be a concept that a part which the representative node in the row direction takes charge of collective file output on is assigned to the priority level in relation of one-on-one. Therefore, in FIG. 5C, a distribution section that becomes a main constituent of behavior is assigned to the node which takes charge of the high-priority particle, and other distribution sections than the distribution section that becomes the main constituent of behavior are assigned to the nodes which take charge of the low-priority particles. The file output is performed individually by each node, or performed collectively by any one of nodes.

<Application to Other Decomposition Methods>

Though the aforesaid exemplary embodiments have been described in combination with the force decomposition method, the mechanism for determining whether the file output is performed on the basis of the priority may be combined with other decomposition methods in the exemplary embodiments. To a decomposition part in a range to be analyzed decomposed in accordance with the predetermined decomposition method, priority corresponding to output processing of an analysis result is set, and whether the analysis result of each decomposition part obtained by the numeric processing section 234 is output or not is switched on the basis of its priority.

For example, particle decomposition (particle decomposition parallelizing processing) resembles the force decomposition, in which particles are arranged in a matrix manner. Therefore, in the application to the particle decomposition method, on its matrix, priority is set to particles or atoms similarly to the case in the aforesaid exemplary embodiment, and whether the file output is performed or not is determined on the basis of the priority. In the force decomposition method, as described in the Patent Document 1, the communication of calculation data is performed only between the specified processors in the force matrix. To the contrary, in the particle decomposition method, the communication among all processors is required, and the ratio of the communication time to all processing time becomes larger than that in the force decomposition method.

In a dimension of the file output of analysis result, the force decomposition method can apply the method in the second comparison example in which the representative node file-outputs collectively the analysis results in the row direction. However, the particle decomposition method cannot adopt the method in the second comparison example; and similarly to the case in the first comparison example of the force decomposition method, any one of the nodes collects the analysis results and file-outputs them or the respective nodes file-output individually the analysis results.

Further, in the application to the spatial decomposition method, priority is set to the decomposed areas similarly to the case in the aforesaid exemplary embodiments, and whether the file output is performed or not is determined on the basis of the priority. For example, in FIG. 1, in behavior analysis of the developer particles 102 in a range area (development nip area) where the peripheral edge of the photoconductor 10 and the peripheral edge of the development roll 140 are opposed to each other and the development action is performed, moving of the toner particles onto the surface of the photoconductor 10 charged according to the record image and the condition of toner particle adhesion onto the photoconductor 10 affect image quality of the record image. Therefore, regarding the development nip area, an analysis target area which is wide to some degree is set and the spatial decomposition method is applied. Particularly, it is good that the priority of the decomposed area including a portion on the surface of the photoconductor 10 charged according to the record image where the toner particles fly is set higher than the priorities of other decomposed areas.

Further, in FIG. 1, in analysis of the agitating step of the development device 40, analysis in the agitation and transport area where the developer particles 102 are agitated and transported by the not-shown agitation and convey member, analysis in the pick-up area between the agitation and transport area and the layer forming area, and analysis in the pick-off area where the developer particles 102 are collected become important. Accordingly, the development roll 140 is set to an area to be analyzed, and the spatial decomposition method is applied to the analysis. Particularly, it is good that priority of the decomposed area including the agitation and transport area, the pick-up are and the pick-off area is set higher than priorities of other decomposed areas.

In the spatial decomposition method, as described in the Patent Document 1, in case that the number of the processors is increased excessively, the ratio of the communication time to all processing time increases and the effect of parallelization is saturated. Similarly to the particle decomposition method, the spatial decomposition method becomes larger than the force decomposition method in the ratio of the communication processing time to all analysis processing time.

From this viewpoint, considering also reduction performance of all the processing time by paralleling processing by means of the plural processors, application of the aforesaid exemplary embodiments to the force decomposition method improves the particle behavior analysis processing performance including the file output processing as a whole.

Although the invention has been described using the exemplary embodiments, the technical scope of the invention is not limited to the scope of the description in the exemplary embodiments. Without departing from the spirit of the invention, various changes and improvements can be added to the exemplary embodiments, and it is intended to cover in the technical scope of the invention also an exemplary embodiment including such changes or improvements.

Further, the aforesaid exemplary embodiments do not define the invention relating to claims, and all combinations of features described in the exemplary embodiments are not essential to means for solving the invention. Inventions in various stages are included in the aforesaid exemplary embodiments, and various inventions can be extracted by appropriate combination of plural disclosed constituent features. Even in case that some constituent features are deleted from all the constituent features shown in the exemplary embodiments, as long as an advantage is obtained, the constitution in which these some constituent features are deleted can be extracted as an invention.

In the aforesaid exemplary embodiments, as the concrete example to which the information processing system is applied, the particle behavior analysis device has been described; and as the apparatus in which the particles to be analyzed exist, the image forming apparatus has been described. However, this is illustrative only.

For example, the particle behavior analysis is not limited to the application to the agitation process or the development process in the development device 40. For example, the particle behavior analysis may be applied to the transfer process in the electrophotographic type transfer device or a cleaning process of the cleaning device. Further, regardless of the particle type and the acting force, the particle behavior analysis may be applied also to a simulation of a system handling all particles (powders). In others than the electrophotographic type, the particle behavior analysis may be applied to a rock-fall simulation, a flow simulation of powder in a hopper, or a flow simulation of powder in a pharmaceutical formulation apparatus.

Further, the mechanism in the aforesaid exemplary embodiments performs efficiently the output processing of information processing results (specifically, calculation results for particle behavior analysis) in the information processing system having the plural processors. Therefore, it is obvious that the mechanism in the aforesaid exemplary embodiments is similarly applied to an information processing system having the similar system configuration. In this case, a target of calculation processing is not limited to the particle behavior analysis, but may be a general matter; the numeric processing section 234 is replaced with a calculation section which performs information processing calculation on the basis of the inputted calculation information; and the output data processing section 236 switches advisability of output of the information processing calculation result.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A particle behavior analysis system for analyzing a plurality of particles, comprising:

at least one processor;

at least one memory storing instructions that, when executed, cause the at least one processor to perform as:

a decomposition processing section that decomposes a distribution range of an attribute of the particles to be analyzed in accordance with a decomposition method into a plurality of decomposition portions, and assigns each decomposition portion to a particle behavior calculation section, the particle behavior calculation section considering, for a decomposition portion of the plurality of decomposition portions, interaction force with another substance that acts on a particle and calculates behavior of the particle, while performing information communication with other devices;

a priority setting section that sets a priority to the decomposition portion, the priority (i) is based on a particle type, and (ii) corresponds to an output processing of an analysis result; and an output processing section that determines whether to output the analysis result obtained by the particle behavior calculation section based on the priority of the decomposition portion and that outputs the analysis result for each decomposition portion that has a priority higher than a predetermined threshold.

2. A particle behavior analysis system for analyzing a plurality of particles, comprising:

at least one processor;

at least one memory storing instructions that, when executed, cause the at least one processor to perform as:

a decomposition processing section that decomposes a distribution range of the articles to be analyzed in accordance with a decomposition method into a plurality of decomposition portions, and assigns each decomposition portion to a particle behavior calculation section, the particle behavior calculation section considering, for a decomposition portion of the plurality of decomposition portions, interaction force with another substance that acts on a particle and calculates behavior of the particle, while performing information communication with other devices;

a priority setting section that sets a priority to the decomposition portion, the priority (i) is based on a distribution of a particle property of the particles in the decomposition portion, and (ii) corresponds to an output processing of an analysis result, to the decomposition portion; and an output processing section that determines whether to output the analysis result obtained by the particle behavior calculation section based on the priority of the decomposition portion and that outputs the analysis result for each decomposition portion that has a priority higher than a predetermined threshold.

3. The particle behavior analysis system according to claim 2, wherein the priority setting section creates a one-to-one mapping between a number of distribution sections and a number of numeric processing sections, and sets priority to each distribution section.

4. A particle behavior analysis system for analyzing a plurality of particles, comprising:

at least one processor;

at least one memory storing instructions that, when executed, cause the at least one processor to perform as:

a decomposition processing section that decomposes a distribution range of the particles to be analyzed in accordance with a decomposition method into a plurality of decomposition portions, and assigns each decomposition portion to a particle behavior calculation section, the particle behavior calculation section considering, for a decomposition portion of the plurality of decomposition portions, interaction force with another substance that acts on a particle and calculates behavior of the particle, while performing information communication with other devices;

a priority setting section that sets a priority to the decomposition portion, the priority (i) is based on a type of an atom composing the particle, and (ii) corresponds to an output processing of an analysis result; and an output processing section that determines whether to output the analysis result obtained by the particle behavior calculation section based on the priority of the decomposition portion and that outputs the analysis result for the decomposition portion that has a priority higher than a predetermined threshold.

5. The particle behavior analysis system according to claim 1, wherein the priority setting section sets higher priority to a decomposition portion that becomes a constituent of behavior that has a greater effect on behavior than other constituents, than to a decomposition portion that becomes the other constituents.

6. The particle behavior analysis system according to claim 1, wherein the priority setting section sets higher priority to a decomposition portion that does not become a constituent of behavior that has a greater effect on behavior than other constituents, than to a decomposition portion that becomes the other constituents.

7. The particle behavior analysis system according to claim 1, further comprising:

a row-direction processing result output section, wherein the decomposition processing section decomposes particles by a force decomposition method using a force matrix, and assigns each decomposition portion to each particle behavior calculation section, and wherein the row-direction processing result output section determines whether to output an analysis result based on the priority, and outputs, in each row direction of the force matrix, collectively the analysis results obtained by the respective particle behavior calculation sections through the output processing section.

8. A non-transitory computer readable medium storing a program causing a computer to execute a process for analyzing a plurality of particles, the process comprising:

decomposing a distribution range of the particles to be analyzed in accordance with a decomposition method into a plurality of decomposition portions, and assigns each decomposition portion to a particle behavior calculation section;

considering interaction force with another substance that acts on a particle, for each decomposition portion, calculating behavior of the particle, with the particle behavior calculation section while performing information communication with other devices;

setting a priority to the decomposition portion, the priority (i) is based on a particle type, and (ii) corresponds to an output processing of an analysis result; and determining whether to output the analysis result obtained by the calculating of the behavior of the particle based on the priority of the decomposition portion and outputting an analysis result for the decomposition portion that has a priority higher than a predetermined threshold.

9. The non-transitory computer readable medium according to claim 8, wherein the setting creates a one-to-one mapping between a number of distribution sections and a number of numeric processing sections, and sets priority to each distribution section.

10. The non-transitory computer readable medium according to claim 8, further comprising:

outputting a row-direction processing result, wherein the decomposing step includes decomposing the distribution range of the particles by a force decomposition method using a force matrix, and wherein the outputting includes determining whether to output the analysis result based on the priority, and outputs, in each row direction of the force matrix, collectively the analysis results obtained by the respective particle behavior calculation section.

11. An information processing system for analyzing a plurality of particles, comprising:

at least one processor;

at least one memory storing instructions that, when executed, cause the at least one processor to perform as:

a decomposition processing section that decomposes a distribution range of an attribute of the particles to be analyzed in accordance with a decomposition method into a plurality of decomposition portions, and assigns each decomposition portion to a particle behavior calculation section, the particle behavior calculation section performing information processing calculation based on inputted calculation information;

a priority setting section that sets a priority to the decomposition portion, the priority (i) is based on a particle type, and (ii) corresponds to an output processing of an analysis result; and an output processing section that determines whether to output the analysis result of the information processing calculation based on the priority and that outputs the analysis result for a decomposition portion that has a priority higher than a predetermined threshold.

12. The information processing system according to claim 11, wherein the priority setting section creates a one-to-one mapping between a number of distribution sections and a number of numeric processing sections, and sets priority to each distribution section.

13. The information processing system according to claim 11, further comprising:

a row-direction processing result output section that determines whether to output the analysis result based on the priority, and outputs, in each row direction of the force matrix, collectively the analysis results obtained by the respective calculation sections through the output processing section, wherein the decomposition processing section decomposes a distribution range of an attribute of the particles by a force decomposition method using a force matrix.

14. A non-transitory computer readable medium storing a program causing a computer to execute a process for analyzing a plurality of articles, the process comprising:

decomposing a distribution range of the particles to be analyzed in accordance with a decomposition method into a plurality of decomposition portions, and assigns each decomposition portion to a particle behavior calculation section;

considering interaction force with another substance that acts on a particle, for each decomposition portion;

calculating behavior of the particle, with the particle behavior calculating section, while performing information communication with other devices;

setting a priority to the decomposition portion, the priority (i) is based on a distribution of a particle property of the particles in the decomposition portion, and (ii) corresponds to an output processing of an analysis result; and determining whether to output the analysis result obtained by the calculating of the behavior of the particle based on the priority of the decomposition portion and outputting the analysis result for the decomposition portion that has a priority higher than a predetermined threshold.

15. A non-transitory computer readable medium storing a program causing a computer to execute a process for analyzing a plurality of particles, the process comprising:

decomposing a distribution range of the particles to be analyzed in accordance with a decomposition method into a plurality of decomposition portions, and assigns each decomposition portion to a particle behavior calculation section;

considering interaction force with another substance that acts on a particle, for each decomposition portion;

calculating behavior of the particle, with the particle behavior calculating section, while performing information communication with other devices;

setting a priority to the decomposition portion, the priority (i) is based on a type of an atom composing the particle, and (ii) corresponds to an output processing of an analysis result; and determining whether to output the analysis result obtained by the calculating of the based on the priority of the decomposition portion and outputting the analysis result for the decomposition portion that has a priority higher than a predetermined threshold.

16. An information processing system for analyzing a plurality of particles, comprising:

at least one processor;

at least one memory storing instructions that, when executed, cause the at least one processor to perform as:

a decomposition processing section that decomposes a distribution range of an attribute of the particles to be analyzed in accordance with a decomposition method into a plurality of decomposition portions, and assigns each decomposition portion to a particle behavior calculation section, the particle behavior calculation section performing information processing calculation based on inputted calculation information;

a priority setting section that sets a priority to the decomposition portion, the priority (i) is based on a distribution of a particle property of the particles in the decomposition portion, and (ii) corresponds to output processing of an analysis result; and an output processing section that determines whether to output the analysis result of the information processing calculation based on the priority and that outputs the analysis result for a decomposition portion that has a priority higher than a predetermined threshold.

17. An information processing system for analyzing a plurality of particles, comprising:

at least one processor;

at least one memory storing instructions that, when executed, cause the at least one processor to perform as:

a decomposition processing section that decomposes a distribution range of an attribute of the particles to be analyzed in accordance with a decomposition method into a plurality of decomposition portions, and assigns each decomposition portion to a particle behavior calculation section, the particle behavior calculation section performing information processing calculation based on inputted calculation information;

a priority setting section that sets a priority to the decomposition portion, the priority (i) is based on a type of an atom composing the particle, and (ii) corresponds to output processing of an analysis result; and an output processing section that determines whether to output the analysis result of the information processing calculation based on the priority and that outputs the analysis result for a decomposition portion that has a priority higher than a predetermined threshold.

* * * * *